(12) United States Patent
Takahashi et al.

(10) Patent No.: US 10,373,737 B2
(45) Date of Patent: Aug. 6, 2019

(54) GROMMET AND GROMMET-EQUIPPED WIRE HARNESS

(71) Applicants: FURUKAWA ELECTRIC CO., LTD., Tokyo (JP); FURUKAWA AUTOMOTIVE SYSTEMS INC., Inukami-gun (JP)

(72) Inventors: Shin Takahashi, Inukami-gun (JP); Kotaro Tomita, Inukami-gun (JP); Masanori Uchibori, Inukami-gun (JP); Sumio Owari, Inukami-gun (JP)

(73) Assignees: FURUKAWA ELECTRIC CO., LTD., Tokyo (JP); FURUKAWA AUTOMOTIVE SYSTEMS INC., Inukami-gun (JP)

( * ) Notice: Subject to any disclaimer, the term of this patent is extended or adjusted under 35 U.S.C. 154(b) by 0 days.

(21) Appl. No.: 15/716,228

(22) Filed: Sep. 26, 2017

(65) Prior Publication Data
US 2018/0019041 A1   Jan. 18, 2018

Related U.S. Application Data

(63) Continuation of application No. PCT/JP2016/059661, filed on Mar. 25, 2016.

(30) Foreign Application Priority Data

Mar. 26, 2015   (JP) ................... 2015-063658

(51) Int. Cl.
*H01B 7/00*   (2006.01)
*H02G 3/04*   (2006.01)
(Continued)

(52) U.S. Cl.
CPC ....... *H01B 7/2825* (2013.01); *B60R 16/0222* (2013.01); *H01B 7/0045* (2013.01);
(Continued)

(58) Field of Classification Search
CPC .......... B60R 16/0222; H01B 7/0045; H02G 3/0468; H02G 3/0691
See application file for complete search history.

(56) References Cited

U.S. PATENT DOCUMENTS 2,961,691 A * 11/1960 Roy ................ C25D 7/0607
                                                    16/2.1
3,229,026 A * 1/1966 Sulzer ............... H02G 3/0616
                                                    16/2.1
(Continued)

FOREIGN PATENT DOCUMENTS

JP   2012-175719   9/2012
JP   2014-60844    4/2014
(Continued)

OTHER PUBLICATIONS

International Search Report dated May 10, 2016 in PCT/JP2016/059661, filed on Mar. 25, 2016 (with English Translation).
(Continued)

*Primary Examiner* — Timothy J Thompson
*Assistant Examiner* — Rhadames Alonzo Miller
(74) *Attorney, Agent, or Firm* — Oblon, McClelland, Maier & Neustadt, L.L.P.

(57) ABSTRACT

There is provided a grommet with water-blocking performance improved by suppression of deformation of a rear end caused by deformation of a fastening fixing portion. The grommet includes: a rear band mounting portion 415 which fastens and fixes a portion displaced from the rear end and overlapping a corrugated tube 5 fitted in the grommet by using a band-shaped binding band 8; and a plurality of rear end-side annular protruding portion 411, first fixed-side annular protruding portion 412, and second fixed-side annular protruding portion 413 protruding from an inner peripheral face and extending in a circumferential direction and disposed along a front-rear direction X so as to be fitted with (Continued)

the corrugated tube 5 by use of protruding and recessed shapes. The rear end-side annular protruding portion 411 is disposed close to the rear end, the first fixed-side annular protruding portion 412 and the second fixed-side annular protruding portion 413 are disposed at a predetermined interval on an inner peripheral face of the rear band mounting portion 415, and a highly deformation absorbable portion 414 having higher deformation absorbing performance than the rear band mounting portion 415 is provided between the rear end-side annular protruding portion 411 and the first fixed-side annular protruding portion 412.

19 Claims, 12 Drawing Sheets

(51) Int. Cl.
   *H02G 3/06*   (2006.01)
   *H02G 3/22*   (2006.01)
   *B60R 16/02*  (2006.01)
   *H01B 7/282*  (2006.01)

(52) U.S. Cl.
   CPC ......... *H02G 3/0468* (2013.01); *H02G 3/0691* (2013.01); *H02G 3/22* (2013.01)

(56) References Cited

U.S. PATENT DOCUMENTS

| | | | | |
|---|---|---|---|---|
| 3,506,999 A * | 4/1970 | Neher | B66B 7/06 | 16/2.1 |
| 3,889,909 A * | 6/1975 | Koscik | F16L 5/00 | 248/56 |
| 3,918,667 A * | 11/1975 | Madden | F16L 5/00 | 248/300 |
| 4,640,479 A * | 2/1987 | Shely | H02G 3/0641 | 16/2.2 |
| 4,993,724 A * | 2/1991 | Hauff | F16L 5/08 | 277/606 |
| 6,010,134 A * | 1/2000 | Katoh | B60R 16/0222 | 174/152 G |
| 6,218,625 B1 * | 4/2001 | Pulaski | B60R 16/0222 | 174/153 G |
| 6,353,185 B1 * | 3/2002 | Sakata | H02G 3/18 | 16/2.1 |
| 6,376,777 B1 * | 4/2002 | Ito | H02G 3/0468 | 16/2.1 |
| 6,627,817 B1 * | 9/2003 | Kortenbach | H02G 3/083 | 174/541 |
| 6,660,937 B1 * | 12/2003 | MacLeod | B60R 16/0222 | 16/2.2 |
| 6,822,165 B2 * | 11/2004 | Nishimoto | B60R 16/0222 | 16/2.1 |
| 6,995,316 B1 * | 2/2006 | Goto | H02G 15/013 | 16/2.1 |
| 2001/0020536 A1 * | 9/2001 | Kondoh | B60R 16/0222 | 174/650 |
| 2005/0148212 A1 * | 7/2005 | Ojima | B60R 16/0215 | 439/34 |
| 2009/0065235 A1 * | 3/2009 | Uchibori | B60R 16/0222 | 174/152 G |
| 2009/0302034 A1 * | 12/2009 | Makela | H02G 3/0658 | 220/3.8 |
| 2010/0307817 A1 * | 12/2010 | Roy | H02G 3/185 | 174/666 |
| 2010/0314158 A1 * | 12/2010 | Suzuki | B60R 16/0222 | 174/152 G |
| 2011/0211326 A1 * | 9/2011 | Drouard | G02B 6/3827 | 361/814 |
| 2012/0048616 A1 * | 3/2012 | Breen, IV | H02G 3/22 | 174/651 |
| 2012/0181754 A1 * | 7/2012 | Levi | H02G 3/088 | 277/616 |
| 2015/0318679 A1 * | 11/2015 | Nakai | H01R 13/5219 | 16/2.2 |

FOREIGN PATENT DOCUMENTS

| | | |
|---|---|---|
| JP | 2015-15822 | 1/2015 |
| JP | 2015-42025 | 3/2015 |

OTHER PUBLICATIONS

Chinese Office Action with English translation dated Mar. 13, 2019 in corresponding Chinese Patent Application No. 201680017132.2.

\* cited by examiner

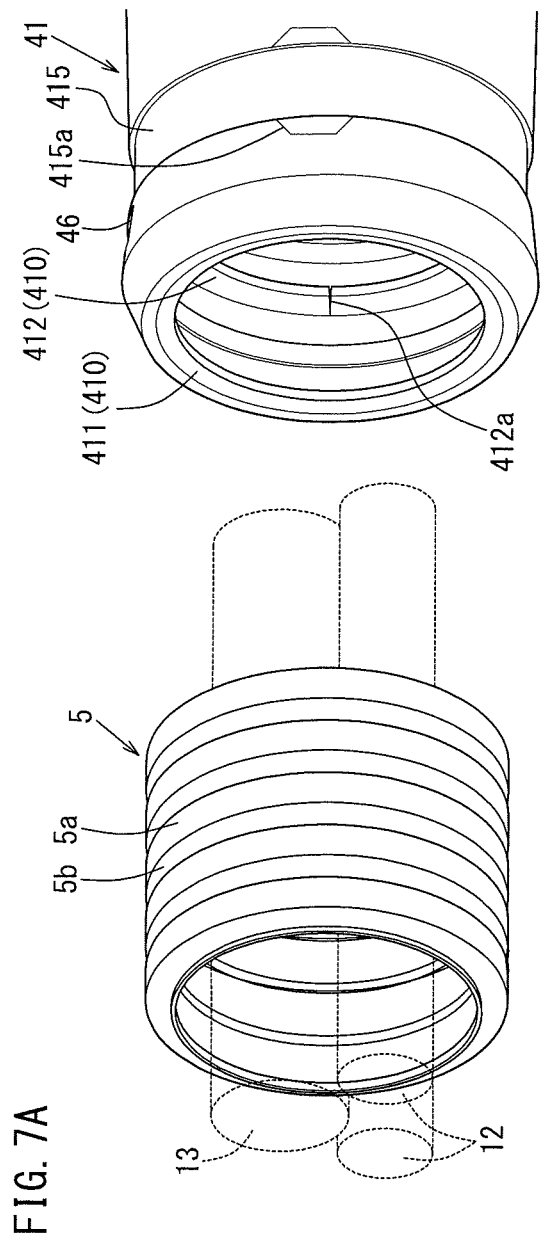
FIG. 7A
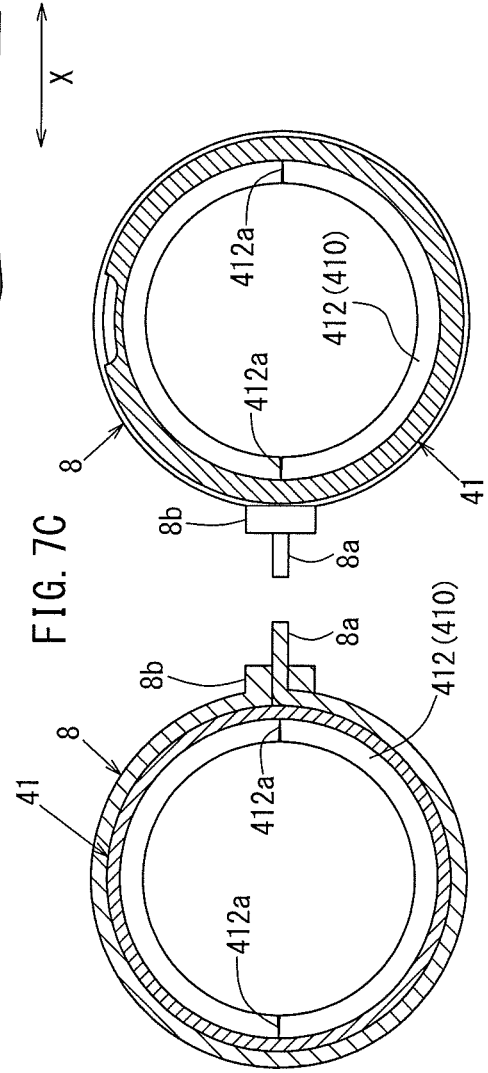
FIG. 7B
FIG. 7C

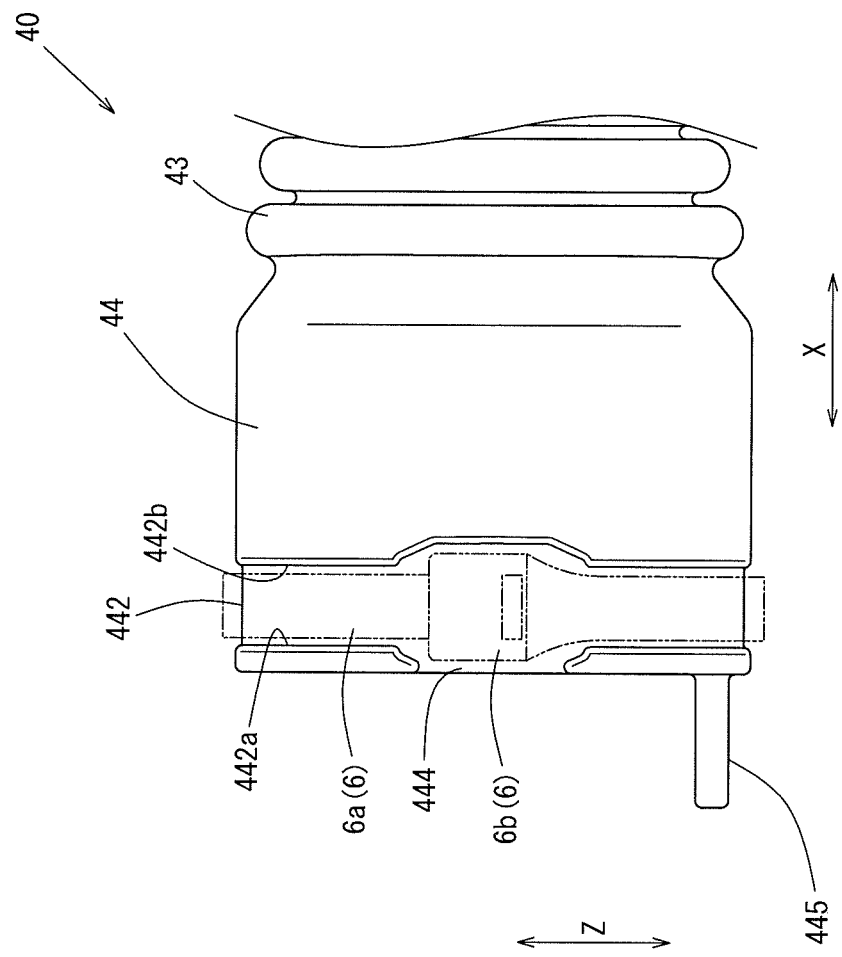

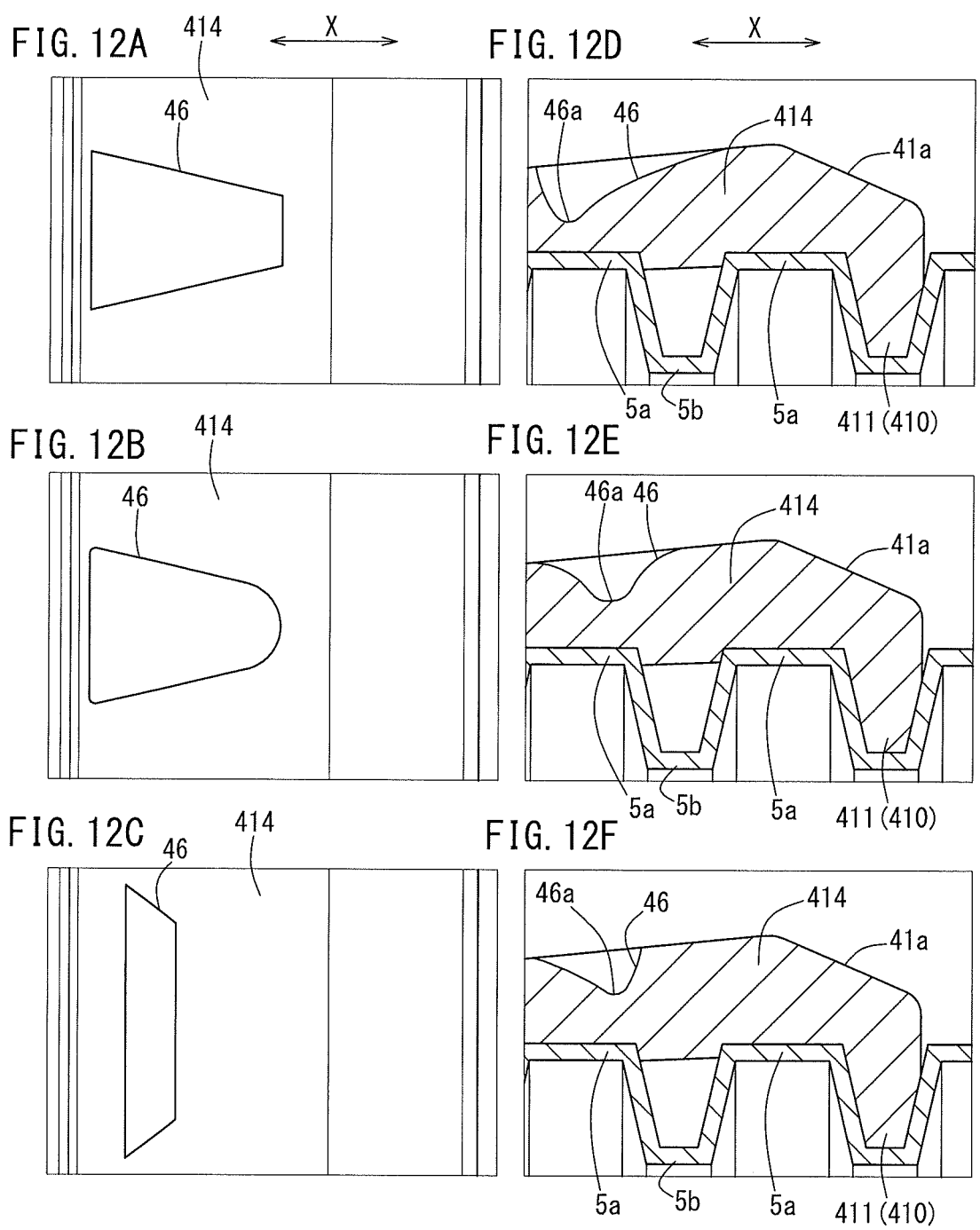

GROMMET AND GROMMET-EQUIPPED WIRE HARNESS

TECHNICAL FIELD

The present invention relates to a substantially cylindrical and elastic grommet through which a corrugated tube surrounding and protecting an insulated wire is inserted in such a manner that the corrugated tube is fitted in the grommet from an end portion, for example, and a grommet-equipped wire harness which includes the grommet.

BACKGROUND ART

Outer peripheral faces of insulated wires which are connected to electronic devices mounted to an automobile to supply electric power and send and receive signals may be surrounded and protected by protective members in some cases as necessary in order to prevent damage caused by interference with surrounding parts and entry of water.

As the protective members for surrounding the insulated wires, there are an accordion corrugated tube for preventing interference of the insulated wire with the surrounding parts, the grommet for preventing entry of water, and the like, for example, and the protective members have different effects.

The protective members may be used separately or in combination with each other as described in Patent Document 1, for example, in which a grommet is used in combination with a corrugated tube.

In the grommet described in Patent Document 1, a plurality of corrugated tube-side sealing ribs, each of which protrudes from an entire circumference, are arranged along an axial direction on an inner peripheral face of a corrugated tube-side end portion of the grommet in which a corrugated tube is fitted and a mounting groove (hereinafter referred to as "fastening fixing portion") into which a fastening band (hereinafter referred to as "fastening member") is fastened is provided to an outer peripheral face of the grommet corresponding to the corrugated tube-side sealing ribs.

The corrugated tube-side sealing ribs are provided with the same pitch as peaks and troughs forming an accordion shape of the corrugated tube which is fitted in the grommet. In other words, the corrugated tube-side sealing ribs are arranged at equal intervals as shown in FIG. 2 in Patent Document 1.

The above-described grommet is assumed to be able to reliably block water by fitting the corrugated tube-side sealing ribs and the troughs of the corrugated tube with each other by use of protruding and recessed shapes and integrally fastening an outer peripheral face of the fitted portion by use of the fastening member.

However, because section stiffness of the corrugated tube-side end portion of the grommet described in Patent Document 1 is increased by the corrugated tube-side sealing ribs disposed at the equal intervals. In other words, shape retaining performance of the corrugated tube-side end portion increases and therefore an influence of deformation by fastening of the fastening member reaches the end portion to deform the portion. In other words, the end portion is deformed as a result of the deformation of the fastening fixing portion and a clearance is created between the corrugated tube and the grommet, which may result in reduction in water-blocking performance.

PRIOR ART DOCUMENT

Patent Document

Patent Document 1: Japanese Laid-Open Patent Publication No. 2015-015822

SUMMARY OF THE INVENTION

Problem to be Solved by the Invention

Therefore, it is an object of the present invention to provide a grommet with water-blocking performance improved by suppression of deformation of an end portion as a result of deformation of a fastening fixing portion.

Solutions to the Problem

A grommet according to an aspect of the present invention is in a substantially cylindrical shape and has elasticity and an accordion armoring member for surrounding an insulated wire is fitted in the grommet from an end portion. The grommet includes: a fastening fixing portion which fastens and fixes a portion displaced from the end portion and overlapping the armoring member fitted in the grommet by using a band-shaped fastening member; and a plurality of protruding portions protruding from an inner peripheral face and extending in a circumferential direction and disposed along an axial direction so as to be fitted with the armoring member by use of protruding and recessed shapes. The protruding portions are formed by an end portion-side protruding portion disposed close to the end portion and a plurality of fixed-side protruding portions disposed at (a) predetermined interval(s) on the inner peripheral face of the fastening fixing portion and a no-protrusion portion where the protruding portion is not disposed is provided between the end portion-side protruding portion and the fixed-side protruding portions.

The above-described accordion armoring member is a concept including a corrugated tube having continuously recessed and protruding outside and inside shapes in a vertical section, an armoring member having a continuously recessed and protruding outside shape and a flat inside shape in a vertical section, and the like. A vertical section continuously provided with substantially rectangular protruding portions and recessed portions or a corrugated vertical section continuously provided with substantially arc-shaped protruding portions and recessed portions may be employed.

The above-described band-shaped fastening member is a concept including synthetic resin and metal binding bands and the like each of which is fastened to the fastening fixing portion to fix the armoring member inside the grommet.

The above-described fastening fixing portion is a concept including a recessed fastening fixing portion formed by recessing an outer peripheral face of the grommet radially inward, a protruding fastening fixing portion formed by protruding the outer peripheral face of the grommet radially outward on opposite sides of the fastening member in the axial direction, a flat fastening fixing portion, and the like.

The above-described no-protrusion portion is a concept including a no-protrusion portion formed to have about the same thickness as a portion without the protruding portion, a no-protrusion portion formed to have a smaller thickness than the portion without the protruding portion, a no-protrusion portion formed to have a smaller thickness than the portion having a protruding portion, and have a larger thickness than the portion without the protruding portion, and the like, for example.

The end portion-side protruding portion and the fixed-side protruding portions with the no-protrusion portion without the protruding portion provided therebetween are disposed at an interval corresponding to two or more pitches of the accordion shape of the armoring member.

According to the aspect of the present invention, it is possible to suppress deformation of the end portion as a result of the deformation of the fastening fixing portion due to fastening (hereinafter referred to as "fastening deformation") to thereby improve the water-blocking performance of the grommet.

This will be described in more detail. By providing the no-protrusion portion where the protruding portions are not disposed between the end portion-side protruding portion and the fixed-side protruding portion, the no-protrusion portion having higher deformation absorbing performance than the portions where the protruding portions are disposed absorbs an influence of fastening deformation of the fastening fixing portion in a fastened state and therefore it is possible to suppress the deformation of the end portion caused by the fastening deformation of the fastening fixing portion. As a result, the end portion-side protruding portion of the grommet with the fastening fixing portion fastened by the fastening member can be fitted with an outer peripheral face of the armoring member by use of the protruding and recessed shapes while in close contact with the outer peripheral face. The deformation absorbing performance refers to deformation suppressing performance in suppression of the deformation of the end portion by absorption of the influence of the fastening deformation.

Moreover, by use of the simple structure in which the protruding portion is not disposed, i.e., the end portion-side protruding portion and the fixed-side protruding portions are disposed at the interval corresponding to the two or more pitches of the accordion shape of the armoring member, it is possible to improve the deformation absorbing performance between the end portion-side protruding portion and the fixed-side protruding portion to thereby suppress the deformation of the end portion as a result of the fastening deformation of the fastening fixing portion to improve the water-blocking performance of the grommet.

With a grommet having a single fixed-side protruding portion, it may be impossible to obtain a stable fitted state between the fixed-side protruding portion and the outer peripheral face of the armoring member. However, because the plurality of fixed-side protruding portions are disposed at a predetermined interval on an inner peripheral face of the fastening fixing portion, a fastening load generated by fastening of the fastening member acts on the plurality of fixed-side protruding portions and it is possible to achieve the stable fitted state between the outer peripheral face of the armoring member and the fixed-side protruding portions by use of the recessed and protruding shapes.

Therefore, the grommet can suppress entry of water into the grommet across the end portion-side protruding portion and can reliably prevent entry of the water into the grommet across the fixed-side protruding portions, which improves the water-blocking performance of the grommet.

The end portion of the grommet may be radially expanded by use of a radially expanding jig in fitting the armoring member into the grommet in some cases. By providing the no-protrusion portion between the end portion-side protruding portion and the fixed-side protruding portions, it is possible to easily and radially expand the end portion of the grommet to fit the armoring member into the grommet.

As another aspect of the present invention, a circumferential dividing portion which divides the fixed-side protruding portion in the circumferential direction may be provided to the fixed-side protruding portion.

The circumferential dividing portion may be formed by a slit, a cut, a groove, a recessed portion, or the like for dividing the fixed-side protruding portion in the circumferential direction. The circumferential dividing portion may be a dividing portion having a suitable depth such as a dividing portion having a depth corresponding to a protruding amount of the fixed-side protruding portion and a dividing portion having a depth which is about half the protruding amount.

The circumferential dividing portion may be provided at a position in the circumferential direction of the fixed-side protruding portion or the plurality of circumferential dividing portions may be provided at a plurality of positions (e.g., two to four positions). If the circumferential dividing portions are provided at the plurality of positions, the dividing portions may be disposed uniformly in the circumferential direction or the plurality of dividing portions may be provided in a predetermined range of the circumferential direction. The circumferential dividing portion(s) may be provided to one of the plurality of fixed-side protruding portions or to all of the fixed-side protruding portions.

According to the aspect of the present invention, the deformation absorbing performance of the fixed-side protruding portion(s) is improved, which reduces the influence of the fastening deformation of the fastening fixing portion. Therefore, it is possible to suppress reduction in the water-blocking performance caused by the deformation of the end portion as a result of the fastening deformation of the fastening fixing portion.

As another aspect of the present invention, the fastening member may be formed by a band portion and a lock portion which locks the band portion and the circumferential dividing portion(s) may be provided at a position of the fixed-side protruding portion corresponding to the lock portion in the circumferential direction and/or an opposed position.

The above-described position corresponding to the lock portion refers to the position at least a part of which overlaps the lock portion when seen from radially outside and the above-described opposed position refers to the position facing the position corresponding to the lock portion in the circumferential direction.

According to the aspect of the present invention, it is possible to improve the performance of the fixed-side protruding portion in absorbing the deformation caused by the fastening of the fastening fixing portion.

This will be described in more detail. When the fastening member formed by the band portion and the lock portion for locking the band portion is fastened, the fastening member is fastened into a substantially oval shape with the lock portion and a portion facing the lock portion positioned in a long axis direction. Therefore, by providing the circumferential dividing portion(s) at the position of the fixed-side protruding portion corresponding to the lock portion and/or the opposed position in the circumferential direction, it is possible to further improve the deformation absorbing performance of the fixed-side protruding portion.

As an aspect of the present invention, the circumferential dividing portion may be provided to the fixed-side protruding portion close to the end portion out of the plurality of fixed-side protruding portions.

According to the aspect of the present invention, as compared with a case in which a circumferential dividing portion is provided to a fixed-side protruding portion on an opposite side from an end portion out of a plurality of fixed-side protruding portions, it is possible to improve the deformation absorbing performance of the fixed-side protruding portion close to the end portion to thereby suppress the reduction in the water-blocking performance caused by the deformation of the end portion as a result of the fastening deformation of the fastening fixing portion.

As another aspect of the present invention, a deformed recessed portion in a recessed shape may be formed in an outer peripheral face of an area on a side of the fastening fixing portion close to the end portion.

The above-described area on the side of the fastening fixing portion close to the end portion refers to the area from the fastening fixing portion to the end portion.

The deformed recessed portion refers to a non-through recessed portion in a groove-shaped or a recessed shape having a predetermined length in at least one of the axial direction and the circumferential direction.

According to the aspect of the present invention, it is possible to improve the deformation absorbing performance of the area from the fastening fixing portion to the end portion and to suppress the reduction in the water-blocking performance caused by the deformation of the end portion as a result of the fastening deformation of the fastening fixing portion.

By providing the end portion-side protruding portion for suppressing the entry of the water into the inside to the end portion, shape retaining performance of the end portion increases and the water-blocking performance may reduce due to the deformation of the end portion as a result of the fastening deformation of the fastening fixing portion. However, because the deformed recessed portion is provided, it is possible to suppress the reduction in the water-blocking performance caused by the deformation of the end portion as a result of the fastening deformation of the fastening fixing portion while suppressing the entry of the water into the inside caused by the end portion-side protruding portion.

As another aspect of the present invention, the deformed recessed portion may be formed in a tapered shape having a groove width gradually reducing toward the end portion.

The above-described tapered shape having the groove width gradually reducing toward the end portion includes a trapezoidal shape, a triangular shape, or a drop shape protruding toward the end portion.

According to the aspect of the present invention, because the influence of the fastening deformation of the fastening fixing portion gradually reduces from the fastening fixing portion toward the end portion, by forming the deformed recessed portion in the tapered shape having the groove width gradually reducing toward the end portion, the deformation is not absorbed locally but absorbed by the entire area from the fastening fixing portion to the end portion, which does not cause a local load.

Moreover, as another aspect of the present invention, the deformed recessed portion may have a groove depth changing in the axial direction and a groove deepest portion may be formed at a position corresponding to a protrusion of the armoring part.

The above-described deformed recessed portion having the groove depth changing in the axial direction may be a deformed recessed portion which has a groove deepest portion close to a center of the deformed recessed portion in the axial direction and which becomes deep from opposite sides, i.e., an opposite side from the end portion and a side close to the end portion, of the deformed recessed portion to the groove deepest portion with smooth inclinations, a deformed recessed portion which has a groove deepest portion at a position slightly displaced from a center of the deformed recessed portion in the axial direction toward an opposite side from the end portion, which becomes deep from the end portion of the deformed recessed portion to the groove deepest portion with a smooth inclination, and which becomes deep from the opposite side from the end portion of the deformed recessed portion to the groove deepest portion with a steep inclination, or a deformed recessed portion which has a groove deepest portion at a position slightly displaced from a center of the deformed recessed portion in the axial direction toward the end portion, which becomes deep from an opposite side from the end portion of the deformed recessed portion to the groove deepest portion with a smooth inclination, and which becomes deep from the end portion of the deformed recessed portion to the groove deepest portion with a steep inclination.

According to the aspect of the present invention, it is possible to control the deformation absorbing performance of the area from the fastening fixing portion to the end portion obtained by the deformed recessed portion to thereby achieve desired deformation.

This will be described in more detail. By changing the groove depth in the axial direction to adjust the position of the groove deepest portion in the axial direction, it is possible to control the deformation absorbing performance of the area from the fastening fixing portion to the end portion obtained by the deformed recessed portion. Moreover, by forming the groove deepest portion at the position corresponding to the protrusion of the armoring part, it is possible to prevent unintended deformation such as curling of the area from the fastening fixing portion to the end portion as a result of provision of the deformed recessed portion.

As an aspect of the present invention, the plurality of fixed-side protruding portions may be formed by the two fixed-side protruding portions.

According to the aspect of the present invention, it is possible to more reliably improve the water-blocking performance of the grommet.

This will be described in more detail. If three or more fixed-side protruding portions are provided, the fastening load generated by the fastening of the fastening member is spread among the three or more fixed-side protruding portions and the fastening load acting on each of the fixed-side protruding portions reduces. However, by providing the two fixed-side protruding portions, it is possible to prevent reduction in the fastening load acting on each of the fixed-side protruding portions and to cause the desired fastening loads to act on the fixed-side protruding portions.

In this way, the two fixed-side protruding portions can be stably fitted with the outer peripheral face of the armoring member by use of the protruding and recessed shapes under the desired fastening loads, which more reliably improves the water-blocking performance of the grommet.

As another aspect of the present invention, the end portion-side protruding portion may be disposed along the end portion.

According to the aspect of the present invention, it is possible to prevent the entry of the water into the inside from the end portion of the grommet, even when high-pressure washing of an area around the grommet is carried out.

This will be described in more detail. For example, in carrying out the high-pressure washing for washing the area around the grommet by use of water jetted at high pressure, if the end portion-side protruding portion is disposed on the inner side of the end portion of the grommet, the water jetted at the high-pressure easily passes through between the armoring member and the grommet and reaches the end portion-side protruding portion to turn up the end portion of the grommet with water pressure acting on the inner side. However, by disposing the end portion-side protruding portion along the end of the grommet, it is possible to prevent the water from entering the grommet to turn up the end portion to thereby improve the water-blocking performance of the grommet.

As an aspect of the present invention, an end portion thin-walled portion gradually becoming thinner toward the end portion may be provided to the outer peripheral face close to the end portion.

According to the aspect of the present invention, it is possible to further improve the deformation absorbing performance of the end portion of the grommet and therefore it is possible to suppress the deformation of the end portion of the grommet as a result of the deformation of the fastening fixing portion to reliably fit the outer peripheral face of the armoring member and the end portion-side protruding portion with each other by use of the recessed and protruding shapes through cooperation between the end portion of the grommet and the no-protrusion portion.

Furthermore, even if the high-pressure washing of the area around the grommet is carried out, the provision of the thin-walled end portion reduces an area of the end portion of the grommet to thereby reduce the water pressure of the jetted water received by an end face and allows the water jetted at the end portion of the grommet to flow along an outer peripheral face of the thin-walled end portion. As a result, it is possible to more reliably prevent curling up of the end portion of the grommet.

As an aspect of the present invention, a length of the no-protrusion portion in the axial direction may be set to a length greater than or equal to an outer dimension of the two protrusions adjacent to each other in the axial direction out of the plurality of protrusions forming the accordion shape of the armoring member and smaller than or equal to an outer dimension of the three protrusions.

The above-described outer dimension is a concept including a dimension between portions corresponding to each other of outer faces of the protruding portions disposed at outermost positions in the axial direction, e.g., a dimension between outer tip end portions of the protrusions.

According to the aspect of the present invention, it is possible to further improve the water-blocking performance of the grommet.

This will be described in more detail. By setting the length of the no-protrusion portion in the axial direction to the length corresponding to the dimension longer than or equal to the outer dimension of the two adjacent protrusions of the armoring member, it is possible to obtain a wide interval between the end portion-side protruding portion having the higher shape retaining performance than the no-protrusion portion and the fixed-side protruding portions, which reliably increases the deformation absorbing performance of the no-protrusion portion between the end portion-side protruding portion and the fixed-side protruding portion to reliably fit the end portion-side protruding portion and the protrusion of the armoring member with each other by use of the protruding and recessed shapes.

On the other hand, by setting the length of the no-protrusion portion in the axial direction to such a length as to correspond to the dimension smaller than or equal to the outer dimension of the three adjacent protrusions of the armoring member, it is possible to suppress excessive increase in the deformation absorbing performance of the no-protrusion portion between the end portion-side protruding portion and the fixed-side protruding portions. In other words, it is possible to maintain a certain level of shape retaining performance to accurately fit the outer peripheral face of the armoring member and the end portion-side protruding portion and the fixed-side protruding portions with each other by use of the recessed and protruding shapes.

In this way, it is possible to further improve the water-blocking performance of the grommet.

A grommet-equipped wire harness according to another aspect of the present invention includes: the above-described grommet; the insulated wire which is inserted through the grommet; the armoring member which surrounds the insulated wire to protect the wire and which is fitted in the grommet from the end portion; and the fastening member which fastens the fastening fixing portion provided to the grommet.

According to the aspect of the present invention, it is possible to improve the water-blocking performance of the portion with which the grommet is fitted to thereby prevent reduction in conductivity of the insulated wire.

As another aspect of the present invention, the fastening fixing portion may be a groove-shaped fastening groove portion formed by recessing the outer peripheral face. According to the aspect of the present invention, the fastening member is disposed to be fitted in the fastening groove portion to correspond to the fixed-side protruding portions. Therefore, it is possible to reliably cause the fastening load generated by the fastening of the fastening member to act on the fixed-side protruding portions.

In this way, it is possible to reliably maintain the fitted state of the outer peripheral face of the armoring member and the fixed-side protruding portions with each other by use of the recessed and protruding shapes to thereby secure the water-blocking performance of the grommet.

As another aspect of the present invention, a length of the fastening groove portion in the axial direction may be defined as a recessed groove width, a length of the fastening member in the axial direction may be defined as a fastening width, a length obtained by subtracting the fastening width from the recessed groove width may be defined as a clearance length, the fastening groove portion may be formed so that the recessed groove width becomes smaller than twice the fastening width, and the fixed-side protruding portions may be formed on the inner peripheral face corresponding to a range of the fastening groove portion which is the clearance length away in the axial direction from each of one wall portion and the other wall portion of the fastening groove portion.

According to the aspect of the present invention, even if the fastening member is displaced in the fastening groove portion, it is possible to reliably cause the fastening load generated by the fastening of the fastening member to act on the plurality of fixed-side protruding portions.

This will be described in more detail. It is possible to position the fixed-side protruding portions in the range corresponding to the fastening member displaced in the axial direction as in the state in which the fastening member is in contact with the one wall portion of the fastening groove portion, in contact with the other wall portion, or oblique with respect to the width direction of the fastening groove portion.

In this way, even if the fastening member is displaced in the axial direction in the fastening groove portion, it is possible to reliably cause the fastening load to act on the plurality of fixed-side protruding portions to thereby improve the water-blocking performance of the grommet.

As another aspect of the present invention, the grommet may be formed with a smaller inside diameter than an outside diameter of the armoring member.

According to the aspect of the present invention, the armoring member expands the grommet or the grommet compresses the armoring member. In other words, because the inner peripheral face of the grommet and the outer peripheral face of the armoring member come in close contact with each other while pushing each other radially inward and outward, it is possible to improve sealing performance of the grommet to further improve the water-blocking performance of the grommet.

Effect of the Invention

According to the aspects of the present invention, it is possible to provide the grommet with the water-blocking performance improved by suppression of the deformation of the end portion as a result of the deformation of the fastening fixing portion.

BRIEF DESCRIPTION OF THE DRAWINGS

FIGS. 7A to 7C are explanatory views of a portion connected to a corrugated tube.

FIG. 11 is an enlarged view of a relevant part showing a cut-away portion in a side view.

FIGS. 12A to 12F are explanatory views of deformed recessed portions.

EMBODIMENT OF THE INVENTION

An embodiment of the present invention will be described below by using the drawings.

Figure 1:
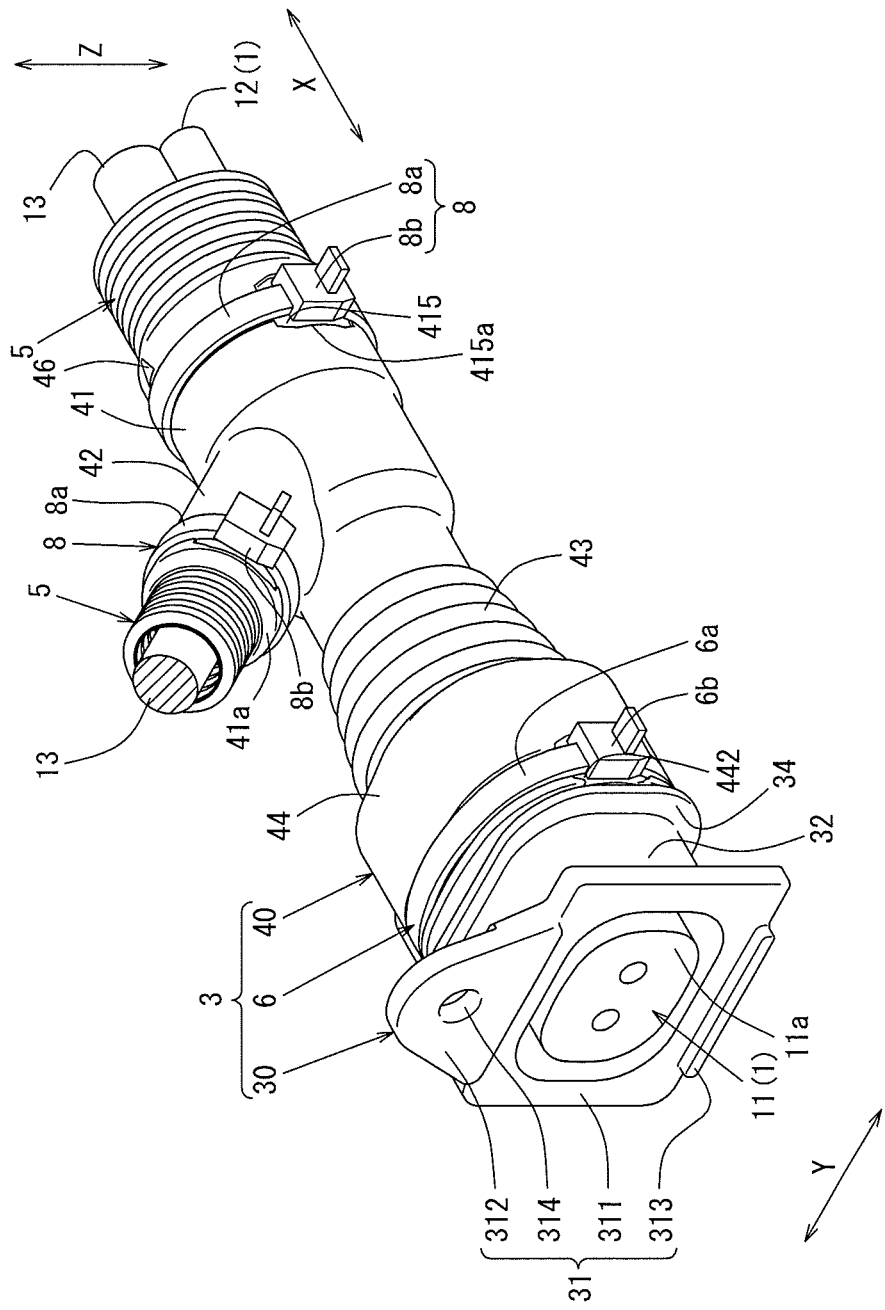
FIG. 1 is an external perspective view showing an external view of a grommet-equipped mounting member in an upper front view.
Figure 2:
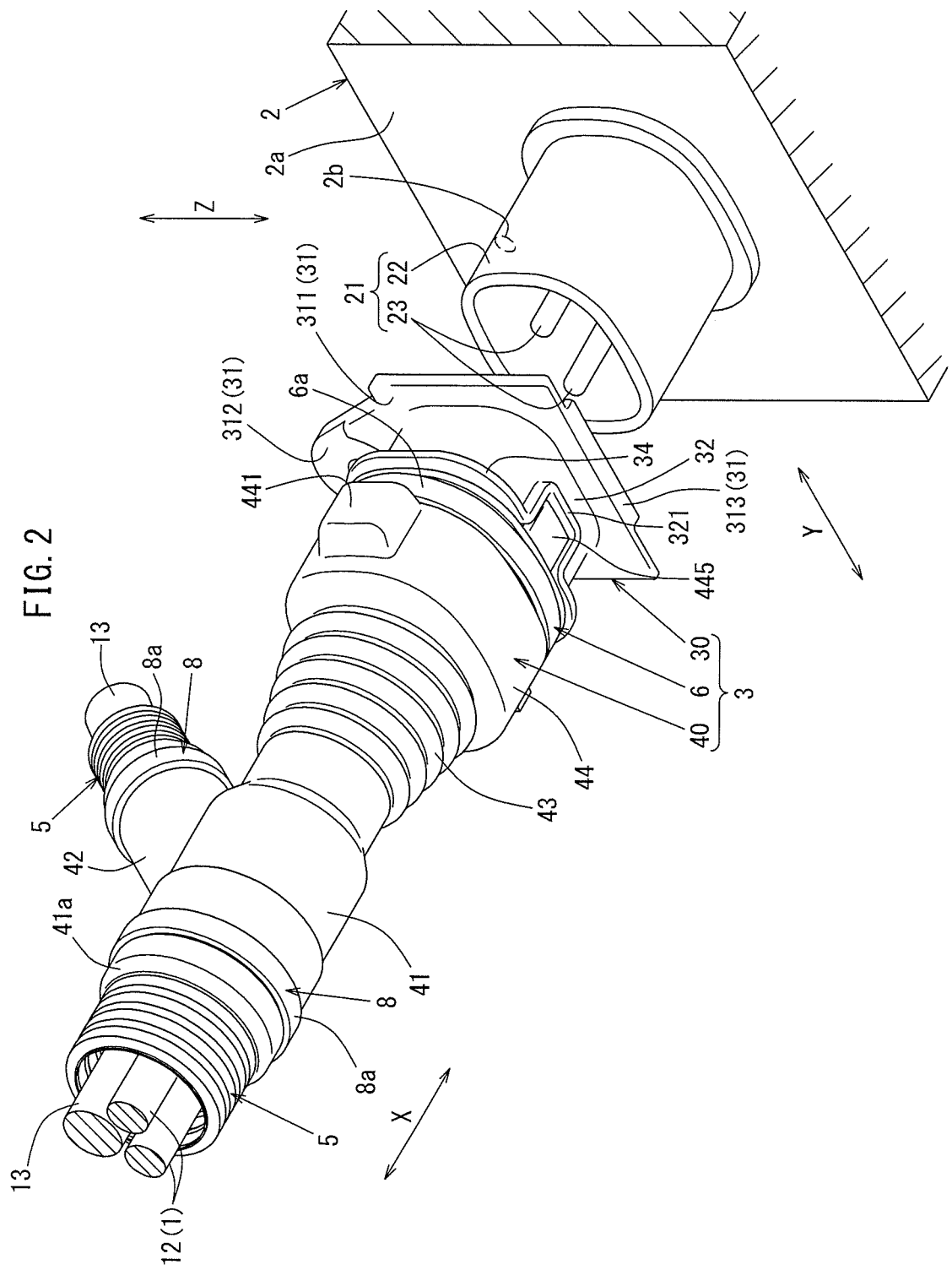
FIG. 2 is an external perspective view showing an external view of the grommet-equipped mounting member and an inverter-side connector in a lower back view.
Figure 3:
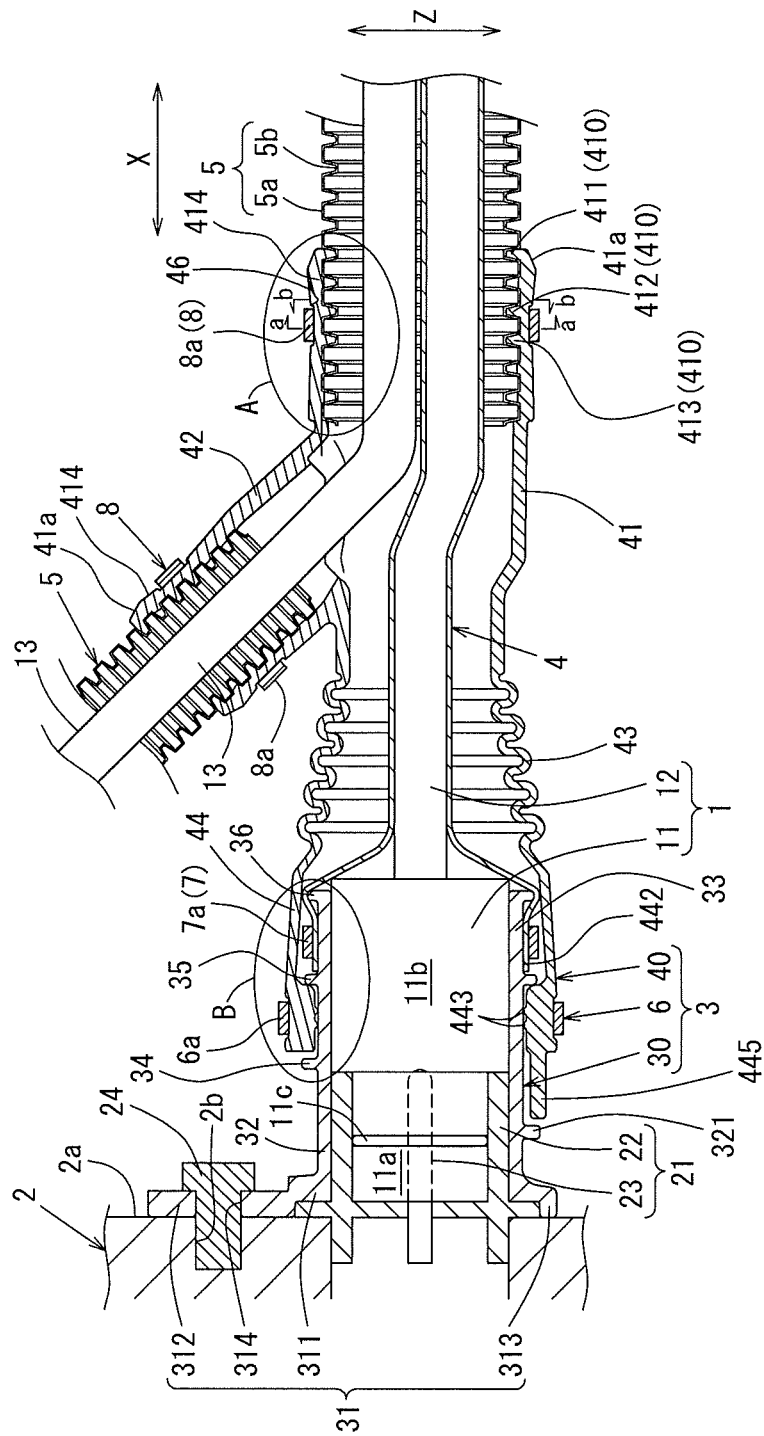
FIG. 3 is a vertical sectional view showing a vertical section of the grommet-equipped mounting member along a front-rear direction.
Figure 4:
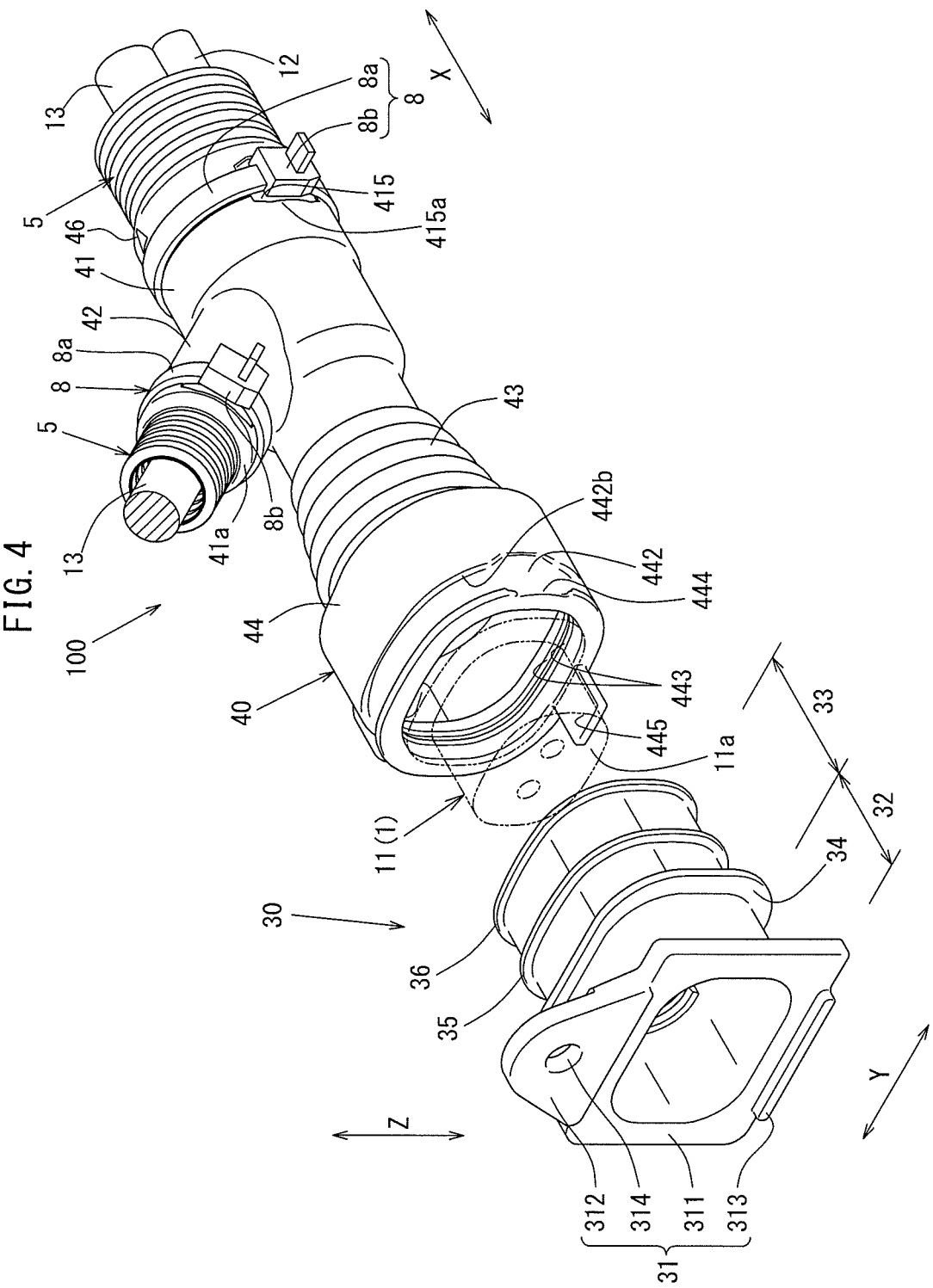
FIG. 4 is an exploded perspective view of an exploded state of the grommet-equipped mounting member in an upper front view.

FIG. 1 is an external perspective view of a grommet-equipped mounting member 3 in an upper front view. FIG. 2 is an external perspective view of the grommet-equipped mounting member 3 and an inverter-side connector 21 in a lower back view. FIG. 3 is a vertical sectional view of the grommet-equipped mounting member 3 along a front-rear direction X. FIG. 4 is an exploded perspective view of the grommet-equipped mounting member 3 in an upper front view.

Figure 5:
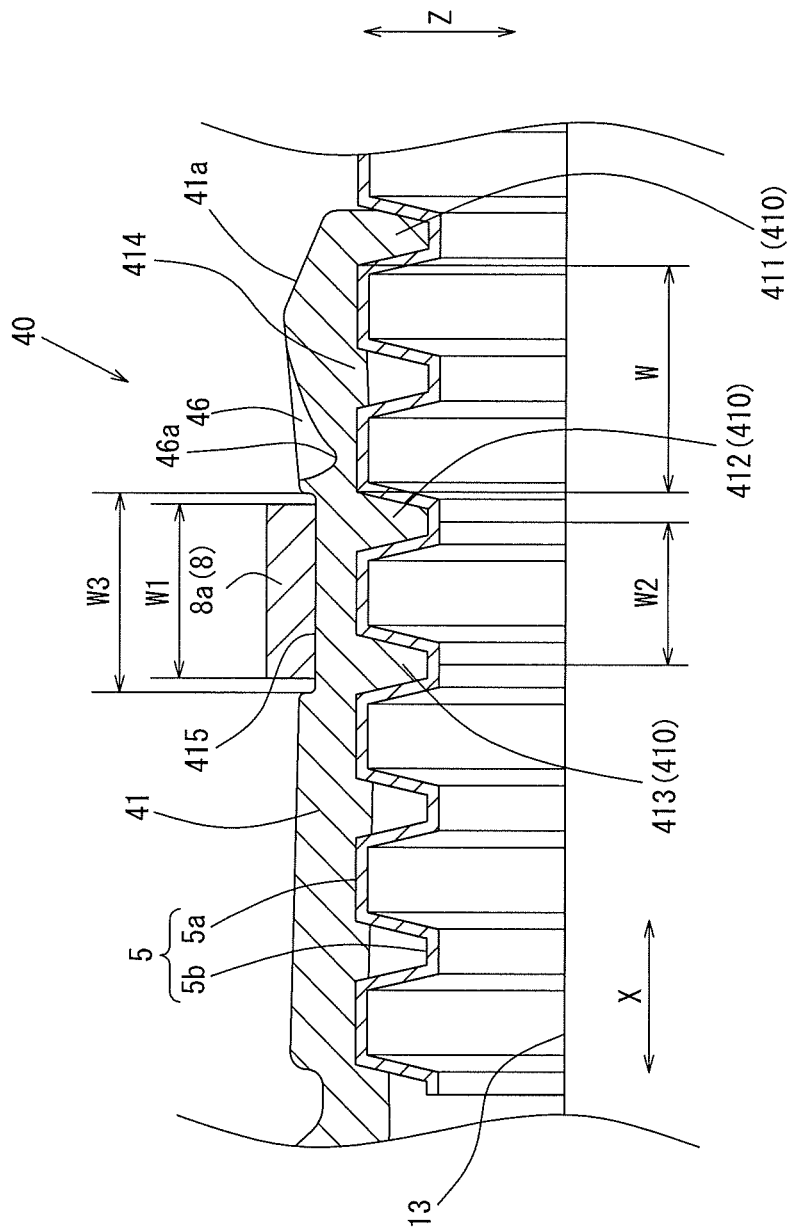
FIG. 5 is an enlarged view of a relevant part showing part "A" in FIG. 3.
Figure 6:
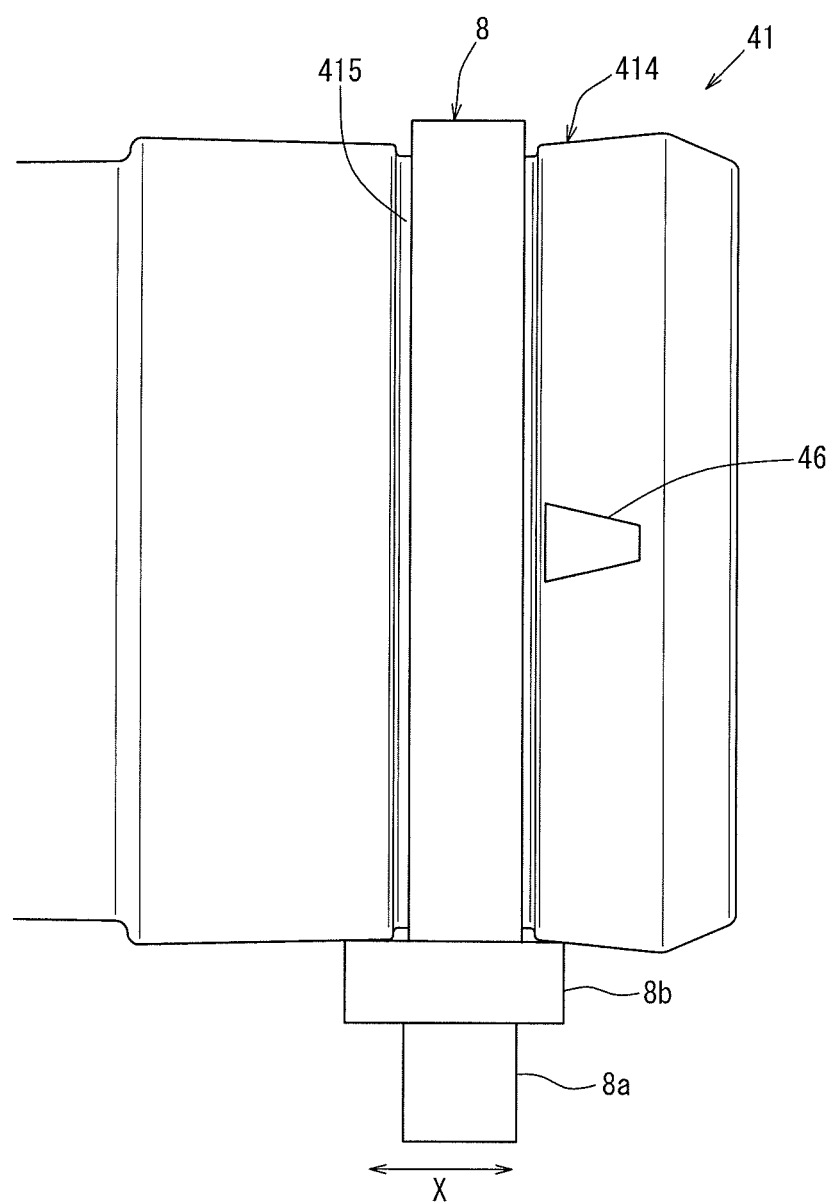
FIG. 6 is an enlarged plan view of a wire surrounding portion.

FIG. 5 is an enlarged view of a relevant part of part "A" in FIG. 3. FIG. 6 is an enlarged plan view of a wire surrounding portion 41. FIGS. 7A to 7 are explanatory views of a portion connected to a corrugated tube 5. This will be described in more detail. FIG. 7A is an exploded perspective view showing an exploded state of the portion connected to the corrugated tube 5 in a back view, FIG. 7B is a sectional view seen in a direction of arrows a-a in FIG. 3, and FIG. 7C is a sectional view seen in a direction of arrows b-b in FIG. 3.

Figure 8:
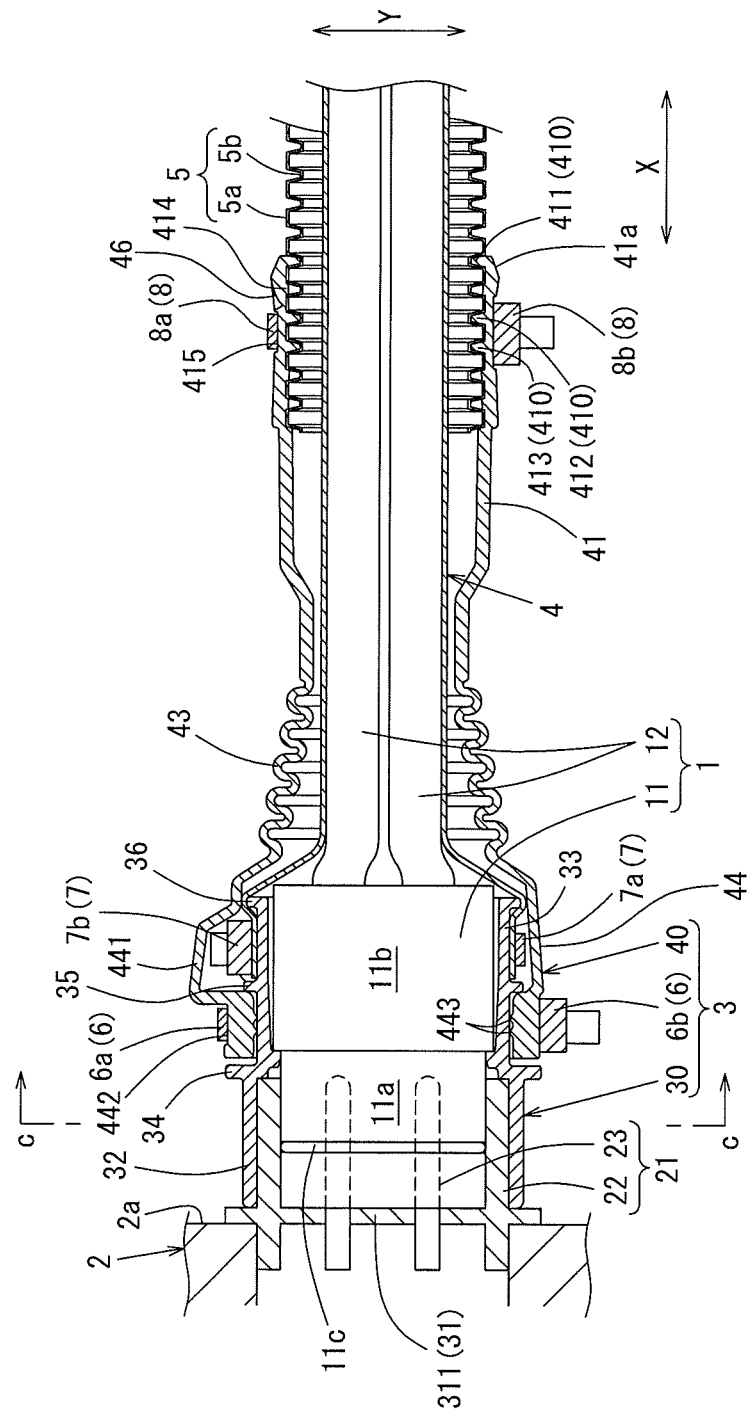
FIG. 8 is a cross-sectional view of a width-direction section of the grommet-equipped mounting member along the front-rear direction.
Figure 9:
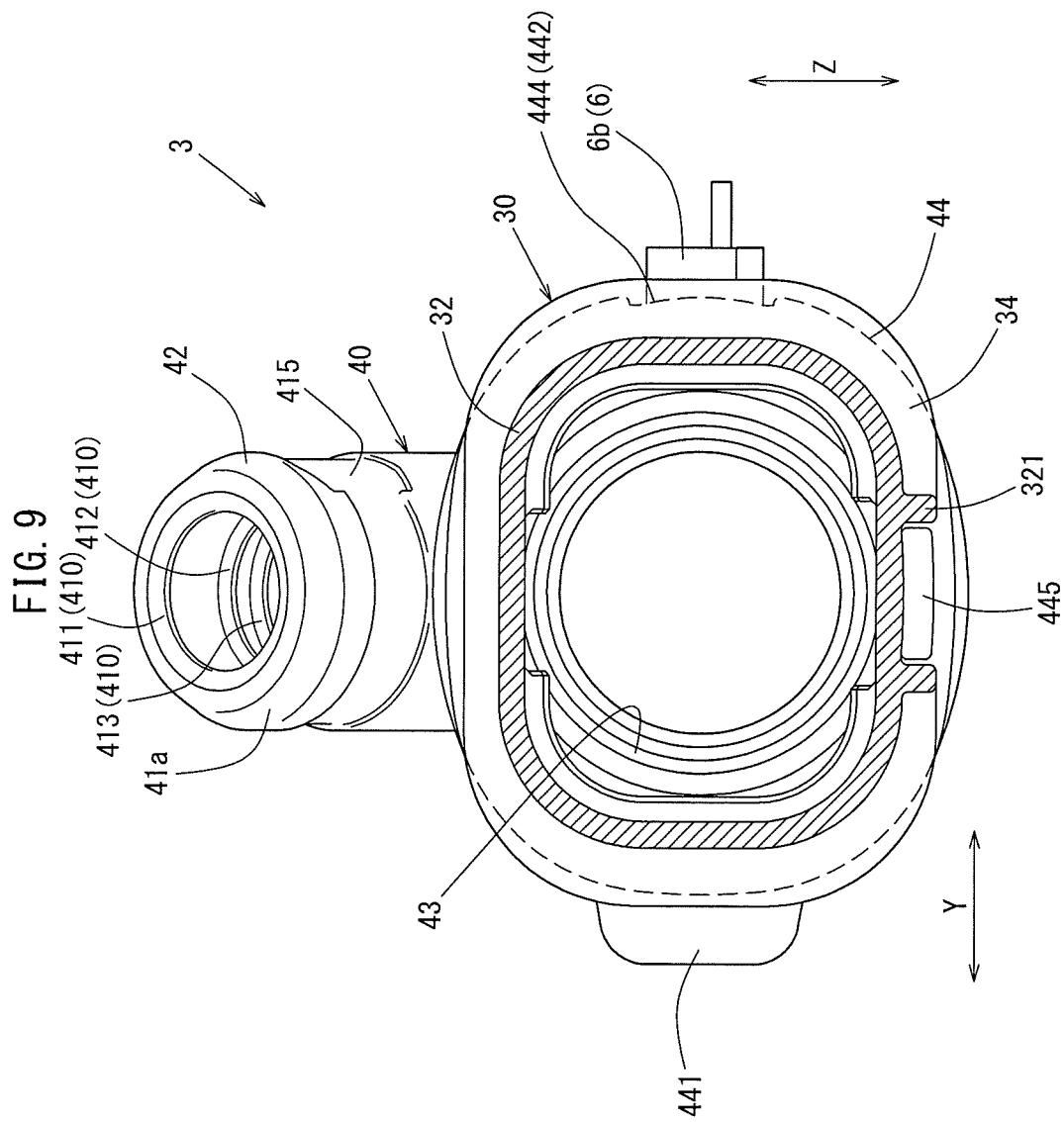
FIG. 9 is a sectional view seen in a direction of arrows c-c in FIG. 8.
Figure 10:
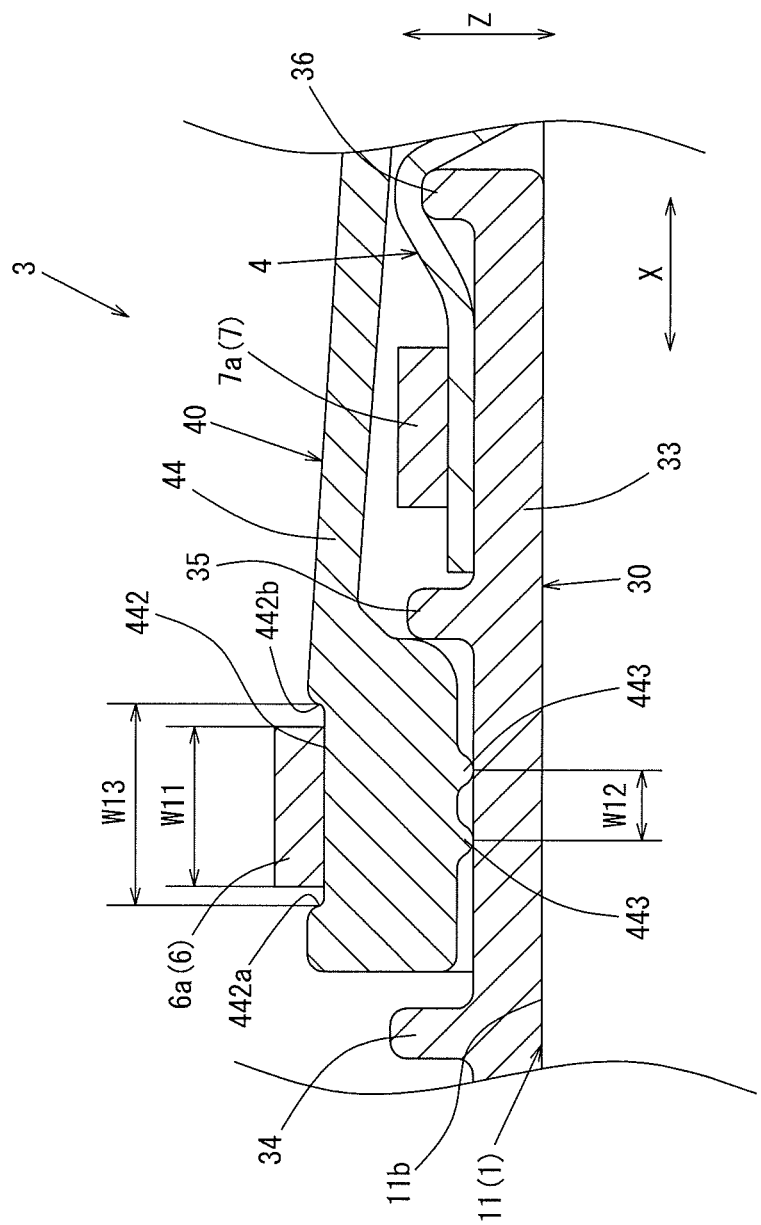
FIG. 10 is an enlarged view of a relevant part showing part "B" in FIG. 3.

FIG. 8 is a cross-sectional view of the grommet-equipped mounting member 3 along the front-rear direction X. FIG. 9 is a sectional view seen in a direction of arrows c-c in FIG. 8. FIG. 10 is an enlarged view of a relevant part showing part "B" in FIG. 3. FIG. 11 is an enlarged view of a relevant part of a cut-away portion 444 in a side view. FIGS. 12A to 12F are explanatory views of deformed recessed portions 46.

For clear illustration, insulated wires 12 and 13 are shown to be longer than the corrugated tube 5 and a grommet 40 in FIGS. 1 to 4, 7F, and 8 and the insulated wires 12 and 13 are shown by broken lines in FIG. 7F. A harness-side connector 11 is shown by two-dot chain lines in FIG. 4, a wire harness 1 is not shown in FIG. 9, and a binding band 6 is shown by two-dot chain lines in FIG. 11.

In FIG. 1, arrow X shows the front-rear direction (hereinafter referred to as "front-rear direction X"), arrow Y shows a width direction (hereinafter referred to as "width direction Y"), and arrow Z shows a vertical direction (hereinafter referred to as "vertical direction Z"). In the front-rear direction X, a side (a left side in FIG. 1) closer to a connector shell 30 (described later) is defined as a front side and a side (a right side in FIG. 1) closer to the wire harness 1 (described later) is defined as a rear side. Moreover, an upper side in FIG. 1 is defined as an upper side and a lower side in FIG. 1 is defined as a lower side.

Although it is not shown in detail in the drawings, the grommet-equipped mounting member 3, which covers connected portions of the wire harness 1, having one end connected to an electric motor, and an inverter 2 in a hybrid automobile, for example, will be described by use of FIGS. 1 to 11 in the embodiment.

First, as shown in FIGS. 1 to 3, the wire harness 1 in the present embodiment is inserted through the grommet-equipped mounting member 3 and connected to the inverter-side connector 21 provided to the inverter 2.

Here, the wire harness 1 and the inverter-side connector 21 will be described.

As shown in FIGS. 1 to 3, the wire harness 1 is formed by the harness-side connector 11 housing two connection terminals (not shown) arranged in the width direction Y therein and two insulated wires 12 connected to the connection terminals in the harness-side connector 11.

The harness-side connector 11 is formed by integrally forming a front portion 11a which is fitted in the inverter-side connector 21 and a rear portion 11b which is fitted in the grommet-equipped mounting member 3 (the connector shell 30 of the grommet-equipped mounting member 3 which will be described later) in this order from the front side.

The front portion 11a of the harness-side connector 11 is in a substantially elongated oval shape which is longer in the width direction Y in a front view and a seal ring 11c which comes in contact with an inside of the inverter-side connector 21 is attached into a recessed groove recessed along an outer periphery near a tip of the front portion 11a.

The rear portion 11b of the harness-side connector 11 is formed in a substantially elongated oval shape larger than and substantially similar to the front portion 11a in the front view.

An outer peripheral face of each of the insulated wires 12 in the wire harness 1 having the above-described structure is covered with a braided wire 4 formed by braiding metal wires into a substantially cylindrical shape.

Furthermore, the two insulated wires 12 and the braided wires 4 are integrally inserted through the corrugated tube 5, which is a substantially cylindrical body made of synthetic resin, together with an insulated wire 13 inserted through a branch portion 42 of the grommet 40 (described later).

The corrugated tube 5 is formed in an accordion shape having a recessed and protruding sectional shape along the front-rear direction X in which protrusions 5a and recesses 5b with substantially trapezoidal sectional shapes are arranged continuously along the front-rear direction X, as shown in FIGS. 2 and 3.

Then, the wire harness 1, the braided wires 4, the insulated wire 13, and a front end of the corrugated tube 5 are housed in the grommet 40 (described later) to form a grommet-equipped wire harness 100 (see FIG. 4).

On the other hand, as shown in FIGS. 2 and 3, the inverter-side connector 21 is formed by a connector housing 22 which is inserted and fixed into an opening hole (not shown) formed in a predetermined size in a mounting face 2a of the inverter 2, two connection terminals 23 disposed in the connector housing 22, and the like.

The connector housing 22 is integrally formed by a main body portion (not shown) protruding farther rearward than the mounting face 2a and an inserted portion (not shown) which is inserted into the opening hole in the mounting face 2a to protrude into the inverter 2.

The main body portion of the connector housing 22 is formed by extending a substantially elongated oval closed sectional shape longer in the width direction Y in the back view in the front-rear direction X and is formed in a substantially cylindrical shape having such an inner face shape that the front portion 11a of the harness-side connector 11 can be fitted in the main body portion.

The two connection terminals 23 are fixed into the main body portion of the connector housing 22 at a predetermined interval in the width direction Y. The connection terminals 23 are connected to the insulated wires (not shown) in the inserted portion of the connector housing 22.

As shown in FIGS. 2 and 3, in the mounting face 2a to which the inverter-side connector 21 is mounted, a threaded hole 2b into which a fixing bolt 24 for fixing the grommet-equipped mounting member 3 (the connector shell 30 (described later) of the grommet-equipped mounting member 3) is screwed is formed above the inverter-side connector 21.

As shown in FIGS. 1 to 4, the grommet-equipped mounting member 3 integrally covering connected portions of the wire harness 1 and the inverter-side connector 21 having the above-described structures is formed by the connector shell 30 which is made of an aluminum alloy and fitted over the inverter-side connector 21, the elastic grommet 40 which is made of synthetic resin and mounted to a rear portion of the connector shell 30, and the binding band 6 which is made of synthetic resin and fixes the grommet 40 to the connector shell 30.

As shown in FIGS. 1 to 4, the connector shell 30 is a cylindrical body extending in the front-rear direction X and is formed by integrally forming a shell base portion 31 which comes in contact with the mounting face 2a, an inverter-side trunk portion 32 in which the inverter-side connector 21 is fitted, and a grommet-side trunk portion 33 which is fitted in the grommet 40 in this order from a front side.

Moreover, the connector shell 30 includes a first flange portion 34 formed at a boundary portion between the inverter-side trunk portion 32 and the grommet-side trunk portion 33 and a second flange portion 35 and a third flange portion 36 formed at the grommet-side trunk portion 33.

As shown in FIGS. 3 and 4, the shell base portion 31 of the connector shell 30 is integrally formed by a base main body 311 which is in a substantially rectangular shape in the front view and has a predetermined thickness in the front-rear direction X and a fastening fixing portion 312 which is in a substantially triangular shape in the front view and extends upward from an upper end of the base main body 311.

Furthermore, at a lower end of the base main body 311, a linear protruding portion 313 protruding forward and extending in the width direction Y is formed.

In the fastening fixing portion 312, a through hole 314 through which the fixing bolt 24 to be screwed into the threaded hole 2b in the inverter 2 is inserted is formed along the front-rear direction X.

As shown in FIGS. 3 and 4, the inverter-side trunk portion 32 of the connector shell 30 is in a substantially cylindrical shape formed by extending a substantially elongated oval closed sectional shape longer in the width direction Y in the back view in the front-rear direction X. An inner face shape of the inverter-side trunk portion 32 is formed in a substantially elongated oval shape in the front view which is substantially similar to the inverter-side connector 21 and is formed in such a size that the inverter-side connector 21 can be fitted in the inverter-side trunk portion 32.

Moreover, as shown in FIGS. 2 and 3, on a lower face of the inverter-side trunk portion 32, a tip mounting portion 321 rising downward and in a recessed groove shape is provided, the recessed groove shape formed by a protrusion in a substantially angular U shape in a bottom view and open on a rear side. The tip mounting portion 321 is formed so that an extending portion 445 (described later) of the grommet 40 can be mounted to the tip mounting portion 321 when the grommet 40 is mounted to the connector shell 30.

As shown in FIGS. 3 and 4, the grommet-side trunk portion 33 of the connector shell 30 is about the same size as the inverter-side trunk portion 32 and is in a cylindrical shape formed by extending a substantially elongated oval closed section longer in the width direction Y in the front-rear direction X.

As shown in FIGS. 3 and 4, the first flange portion 34 of the connector shell 30 is formed in a substantially elongated oval shape in the front view and protruding outward from an outer peripheral face of the boundary portion between the inverter-side trunk portion 32 and the grommet-side trunk portion 33. The first flange portion 34 is formed in the shape having greater protruding lengths (lengths in a thickness direction of the inverter-side trunk portion 32) at curved portions of the substantially elongated oval shape in the front view than protruding lengths (lengths in the thickness direction of the inverter-side trunk portion 32) at straight portions (see FIG. 9).

As shown in FIGS. 3 and 4, the second flange portion 35 of the connector shell 30 is formed in a substantially elongated oval shape in the front view protruding outward from an outer peripheral face of a substantially central portion of the grommet-side trunk portion 33 in the front-rear direction X.

As shown in FIGS. 3 and 4, the third flange portion 36 of the connector shell 30 is about the same size as the second flange portion 35 and formed in a substantially elongated oval shape in the front view protruding outward from a rear end of the grommet-side trunk portion 33.

As shown in FIG. 3, a binding band 7 which is made of synthetic resin and fixes the braided wire 4 covering the connector shell 30 from outside is wound around a portion of the connector shell 30 between the second flange portion 35 and the third flange portion 36.

The binding band 7 is integrally formed by a band portion 7a substantially in a band shape longer in a circumferential direction of the connector shell 30 and a lock portion 7b which is provided to one end of the band portion 7a and locks the band portion 7a inserted through the lock portion 7b.

The binding band 7 is wound so that the lock portion 7b is positioned at the curved portion of the substantially elongated oval shape in the front view of the connector shell 30 (see FIG. 8).

As shown in FIGS. 1 to 4, the grommet 40 is formed into a substantially cylindrical body having an internal space through which the wire harness 1 is inserted.

This will be described in more detail. The grommet 40 is integrally formed by a wire surrounding portion 41 surrounding the insulated wires 12 and 13 with the corrugated tube 5 interposed therebetween, the branch portion 42 which branches upward from a portion close to a front end of the wire surrounding portion 41 and through which the insulated wire 13 is inserted, an accordion portion 43 surrounding portions near connected portions of the harness-side connector 11 and the insulated wires 12, and a connector surrounding portion 44 surrounding the harness-side connector 11 with the grommet-side trunk portion 33 of the connector shell 30 interposed therebetween.

As shown in FIGS. 2 and 3, the wire surrounding portion 41 of the grommet 40 is formed in a substantially circular cylindrical shape having a smaller inside diameter than an outside diameter of the corrugated tube 5. An outer face of a rear end of the wire surrounding portion 41 is formed in a shape having a thin-walled inclined portion 41a inclined to have an outside diameter gradually reducing rearward.

Furthermore, on an inner peripheral face near the rear end of the wire surrounding portion 41, a plurality of annular protruding portions 410 protruding inward and extending along a circumferential direction are formed.

As shown in FIG. 5, the annular protruding portions 410 have substantially trapezoidal sections along the front-rear direction X and are formed in such sizes as to be fitted in the recesses 5b of the corrugated tube 5 by use of protruding and recessed shapes.

The annular protruding portions 410 are formed by a rear end-side annular protruding portion 411 formed along a rear end opening edge of the wire surrounding portion 41 and fixed-side annular protruding portions 412 and 413 disposed in front of and at predetermined distances from the rear end-side annular protruding portion 411 and the rear end-side annular protruding portion 411 and the fixed-side annular protruding portions 412 and 413 are arranged in this order forward from the rear end.

This will be described in more detail. The first fixed-side annular protruding portion 412 is formed in front of the rear end-side annular protruding portion 411 and at the distance corresponding to an outer dimension W of the two adjacent protrusions 5a of the corrugated tube 5 from the rear end-side annular protruding portion 411.

The second fixed-side annular protruding portion 413 is formed in front of the first fixed-side annular protruding portion 412 to be able to be fitted in the recess 5b of the corrugated tube 5 adjacent to the recess 5b in which the first fixed-side annular protruding portion 412 is fitted.

As described later, slits 412a dividing the first fixed-side annular protruding portion 412 in a circumferential direction are provided in the front-rear direction X to the rear first fixed-side annular protruding portion 412 out of the fixed-side annular protruding portions 412 and 413 corresponding to a rear band mounting portion 415.

The slits 412a are cuts dividing the first fixed-side annular protruding portion 412 in the circumferential direction and are provided at a position of the first fixed-side annular protruding portion 412, which is formed to extend in the circumferential direction, corresponding to a lock disposing portion 415a where a lock portion 8b of a binding band 8 (described later) is disposed, i.e., the position overlapping the lock disposing portion 415a when seen from radially outside and a position facing the position corresponding to the lock disposing portion 415a in the circumferential direction as shown in FIGS. 7B and 7C. In other words, the slits 412a are provided in two positions on sides in a horizontal direction in FIGS. 7A to 7C.

As described above, the grommet 40 on which the annular protruding portions 410 are arranged has a range in which the two adjacent protrusions 5a of the corrugated tube 5 positioned between the rear end-side annular protruding portion 411 and the first fixed-side annular protruding portion 412 and the wire surrounding portion 41 are not fitted with each other by use of the protruding and recessed shapes when the grommet 40 is fitted over the corrugated tube 5.

The range in which the wire surrounding portion 41 and the corrugated tube 5 are not fitted with each other by use of the recessed and protruding shapes does not have a protruding portion similar to the annular protruding portions 410, has higher deformation absorbing performance than the wire surrounding portion 41 near the annular protruding portions 410, and is referred to as "highly deformation absorbable portion 414".

In an outer peripheral face of the highly deformation absorbable portion 414 behind the rear band mounting portion 415 (described later), i.e., behind the first fixed-side annular protruding portion 412 in the front-rear direction X, a deformed recessed portion 46 which does not pass through the highly deformation absorbable portion 414 is formed.

The deformed recessed portion 46 is a recessed portion which is in a tapered trapezoidal shape in a plan view having a groove width gradually reducing toward the rear end in the front-rear direction X and which has a groove depth changing in the front-rear direction X.

This will be described in more detail. A groove deepest portion 46a of the deformed recessed portion 46 which is the recessed portion having the groove depth changing in the front-rear direction X is formed in a position corresponding to the fitted protrusion 5a of the corrugated tube 5 between the plurality of rear end-side annular protruding portion 411 and the first fixed-side annular protruding portion 412, i.e., the position overlapping the protrusion 5a when viewed from radially outside.

The groove deepest portion 46a of the deformed recessed portion 46 having the groove depth changing in the front-rear direction X is disposed at a position of the deformed recessed portion 46 slightly displaced forward from a center in the front-rear direction X and the deformed recessed portion 46 has a substantially V shaped section along the front-rear direction X which becomes deep from the deformed recessed portion 46 to the groove deepest portion 46a with a smooth inclination and becomes deep from a position close to the rear band mounting portion 415, i.e., a rear end of the deformed recessed portion 46 to the groove deepest portion 46a with a steep inclination.

On the other hand, in an outer peripheral face of a portion of the wire surrounding portion 41 close to the rear end, as shown in FIGS. 3 and 4, the rear band mounting portion 415 which is recessed along the circumferential direction at substantially the same position as the first fixed-side annular protruding portion 412 and the second fixed-side annular protruding portion 413 and around which the binding band 8 made of synthetic resin is wound is formed.

The binding band 8 is integrally formed by a band portion 8a substantially in a band shape longer in the circumferential direction of the wire surrounding portion 41 and the lock portion 8b which is provided to one end of the band portion 8a and locks the band portion 8a inserted through the lock portion 8b.

As shown in FIG. 5, the rear band mounting portion 415 is formed in a recessed groove shape having such a length in the front-rear direction X that a rear wall of the rear band mounting portion 415 and a rear end of the binding band 8 can come in contact with each other at a position corresponding to the first fixed-side annular protruding portion 412 and that a front wall of the rear band mounting portion 415 and a front end of the binding band 8 can come in contact with each other at a position corresponding to the second fixed-side annular protruding portion 413.

In other words, the rear band mounting portion 415 is formed so that the first fixed-side annular protruding portion 412 and the second fixed-side annular protruding portion 413 are disposed in a predetermined range of the rear band mounting portion 415 along the front-rear direction X.

This will be described in more detail. The length of the rear band mounting portion 415 in the front-rear direction X is defined as a mounting portion groove width, a length of the band portion 8a of the binding band 8 in the front-rear direction X is defined as a band width, and a length in the front-rear direction X obtained by subtracting the band width from the mounting portion groove width is defined as a clearance length.

At this time, assuming that the mounting portion groove width of the rear band mounting portion 415 is smaller than twice the band width, a range of the rear band mounting portion 415 which is the clearance length away in the front-rear direction X from each of a front end and a rear end of the rear band mounting portion 415 is defined as the predetermined range of the rear band mounting portion 415 along the front-rear direction X.

The rear band mounting portion 415 having the mounting portion groove width smaller than twice the band width is formed in the outer peripheral face of the wire surrounding portion 41 so that the predetermined range of the rear band mounting portion 415 along the front-rear direction X faces the first fixed-side annular protruding portion 412 and the second fixed-side annular protruding portion 413.

In other words, as shown in FIG. 5 and the following "Expression 1", the binding band 8 is formed so that its length in the front-rear direction X (hereinafter referred to as "band width W1") becomes greater than or equal to an interval between the first fixed-side annular protruding portion 412 and the second fixed-side annular protruding portion 413 in the front-rear direction X (hereinafter referred to as "protruding portion interval W2").

As shown in the following "Expression 2", the rear band mounting portion 415 is formed so that its length in the front-rear direction X (hereinafter referred to as "mounting portion groove width W3") becomes greater than the protruding portion interval W2 and smaller than a length obtained by subtracting the protruding portion interval W2 from the band width W1 multiplied by "2".

$$W2 \leq W1 \quad \text{[Expression 1]}$$

W1: band width
W2: protruding portion interval $$W2 < W3 < 2 \times W1 - W2 \quad \text{[Expression 2]}$$

W3: mounting portion groove width

As shown in FIGS. 3 and 4, the branch portion 42 of the grommet 40 is in a substantially circular cylindrical shape extending forward and diagonally upward so as to communicate with an internal space of the wire surrounding portion 41. Because a tip of the branch portion 42 has a similar structure to the rear end portion of the wire surrounding portion 41 and therefore will be provided with the same reference signs as the wire surrounding portion 41 and will not be described in detail.

As shown in FIGS. 3 and 4, the accordion portion 43 of the grommet 40 extends so that its substantially circular closed section in the front view is in a substantially elongated oval closed sectional shape in the front view which is longer in the width direction Y and that its inside and outside diameters increase forward from the front end of the wire surrounding portion 41.

As shown in FIGS. 3 and 4, the connector surrounding portion 44 of the grommet 40 is formed to have a substantially elongated oval closed sectional shape in the back view which is longer in the width direction Y, and formed in a substantially cylindrical shape extending in the front-rear direction X. This will be described in more detail. The connector surrounding portion 44 extends forward from the accordion portion 43 such that a front end portion of the connector surrounding portion 44 comes close to and faces the first flange portion 34 of the connector shell 30 when the connector surrounding portion 44 is mounted to the connector shell 30.

An outer face of the connector surrounding portion 44 is formed to have a substantially elongated oval shape in the front view with a greater length in the vertical direction Z than a length of the first flange portion 34 in the vertical direction Z and a smaller length in the width direction Y than a length of the first flange portion 34 in the width direction Y.

On the other hand, an inner face of the connector surrounding portion 44 is formed in a substantially elongated oval shape in the front view which is smaller than and substantially similar to a shape of an outer face of the grommet-side trunk portion 33 of the connector shell 30 and is formed in such a size that the grommet-side trunk portion 33 can be fitted in the connector surrounding portion 44.

As shown in FIG. 2, at a top of one of curved portions of the substantially elongated oval shape in the front view of the connector surrounding portion 44, a bulging portion 441 bulging outward in the width direction Y is formed.

As shown in FIG. 8, the bulging portion 441 is formed at a portion corresponding to a part, between the second flange portion 35 and the third flange portion 36, of the grommet-side trunk portion 33 in a state in which the connector shell 30 is fitted in the grommet 40. The bulging portion 441 is formed as an internal space capable of housing the lock portion 7b of the binding band 7.

In addition, as shown in FIGS. 1 and 3, a front band mounting portion 442 to which the binding band 6 for fixing the grommet 40 to the connector shell 30 is mounted is formed in an outer peripheral face of the front end portion of the connector surrounding portion 44.

The binding band 6 is integrally formed by a band portion Ga which is substantially in a band shape and wound around the connector surrounding portion 44 and a lock portion 6*b* which is provided to one end of the band portion 6*a* and locks the band portion 6*a* inserted through the lock portion 6*b*.

The binding band 6 is wound around the connector surrounding portion 44 so that the lock portion 6*b* is positioned at a position facing the cut-away portion 444 (see FIG. 9) of the front band mounting portion 442 (described later) in the front-rear direction X.

As shown in FIG. 3, the front band mounting portion 442 is formed in an outer peripheral face corresponding to the portion of the grommet-side trunk portion 33 between the first flange portion 34 and the second flange portion 35 when the connector shell 30 is fitted in the grommet 40.

This will be described in more detail. As shown in FIG. 10, the front band mounting portion 442 is formed in a recessed shape along a circumferential direction of the connector surrounding portion 44 and in a recessed groove shape having a front wall portion 442*a* and a rear wall portion 442*b* of smaller heights than a wall thickness of the band portion 6*a* of the binding band 6 on a front side and a rear side, respectively.

On an inner peripheral face of the connector surrounding portion 44 corresponding to the front band mounting portion 442, two lip portions 443 protruding inward and extending along the circumferential direction are arranged along the front-rear direction X.

The two lip portions 443 are formed in an area in which the band portion 6*a* of the binding band 6 when its front end is in contact with the front wall portion 442*a* of the front band mounting portion 442 and the band portion 6*a* of the binding band 6 when its front end is in contact with the rear wall portion 442*b* of the front band mounting portion 442 overlap each other in a section in the front-rear direction X.

In other words, the front band mounting portion 442 is formed so that the two lip portions 443 are positioned in a predetermined range along the front-rear direction X of the front band mounting portion 442.

This will be described in more detail. The length of the front band mounting portion 442 in the front-rear direction X is defined as a mounting portion groove width, a length of the band portion 6*a* of the binding band 6 in the front-rear direction X is defined as a band width, and a length in the front-rear direction X obtained by subtracting the band width from the mounting portion groove width is defined as a clearance length.

At this time, assuming that the mounting portion groove width of the front band mounting portion 442 is smaller than twice the band width, a range of the front band mounting portion 442 which is the clearance length away in the front-rear direction X from each of the front wall portion 442*a* and the rear wall portion 442*b* is defined as the predetermined range of the front band mounting portion 442 along the front-rear direction X.

The front band mounting portion 442 having the mounting portion groove width smaller than twice the band width is formed in the outer peripheral face of the connector surrounding portion 44 so that the predetermined range of the front band mounting portion 442 along the front-rear direction X faces the two lip portions 443.

In other words, as shown in FIG. 10 and the following "Expression 3", the binding band 6 is formed so that its length in the front-rear direction X (hereinafter referred to as "band width W11") becomes greater than or equal to an interval between the two lip portions 443 in the front-rear direction X (hereinafter referred to as "lip portion interval W12").

As shown in the following "Expression 4", the front band mounting portion 442 is formed so that its length in the front-rear direction X (hereinafter referred to as "mounting portion groove width W13") becomes greater than the lip portion interval W12 and smaller than a length obtained by subtracting the lip portion interval W12 from the band width W11 multiplied by "2".

$$W12 \leq W11 \qquad \text{[Expression 3]}$$

W11: band width
W12: lip portion interval $$W12 < W13 < 2 \times W11 - W12 \qquad \text{[Expression 4]}$$

W13: mounting portion groove width

As shown in FIGS. 4, 8, and 9, the cut-away portion 444 formed by cutting away, along the front-rear direction X, a top of a curved portion facing the bulging portion 441 in the width direction Y in the front view is formed in the front wall portion 442*a* of the front band mounting portion 442.

As shown in FIG. 11, the cut-away portion 444 is formed in a substantially trapezoidal shape which is wider on a rear side and narrower on a front side in the side view by cutting away a range facing the lock portion 6*b* of the binding band 6 in the front view.

This will be described in more detail. The cut-away portion 444 is formed in the substantially trapezoidal shape in the side view which has a front cut-away length and a rear cut-away length in the vertical direction Z greater than a length of the lock portion 6*b* in the vertical direction Z.

The cut-away portion 444 is formed to face a portion on an inner side of an outer peripheral edge of the first flange portion 34 when the grommet 40 is mounted to the connector shell 30.

In addition, as shown in FIGS. 2 and 3, the connector surrounding portion 44 is provided at a lower portion of the front end thereof with the extending portion 445 which extends forward from a straight portion of the substantially elongated oval shape in the front view and which is in a substantially rectangular shape in the plan view. The extending portion 445 is formed so as to be able to be mounted to the tip mounting portion 321 of the connector shell 30 when the grommet 40 is mounted to the connector shell 30.

Next, a method of mounting the grommet-equipped mounting member 3 having the above-described structure will be described briefly. First, after inserting the grommet-side trunk portion 33 of the connector shell 30 into the braided wire 4, the binding band 7 is wound around the grommet-side trunk portion 33 to mount the braided wire 4 to the grommet-side trunk portion 33.

Then, after fitting the wire harness 1, which has been inserted through the grommet 40 in advance, in the connector shell 30, the connector shell 30 is fitted in the grommet 40. Then, the binding band 8 and the binding band 6 are respectively wound around the rear band mounting portion 415 and the front band mounting portion 442 to form the grommet-equipped mounting member 3 into which the wire harness 1 is inserted.

Because the grommet-equipped wire harness 100 is formed by the grommet 40, the insulated wires 12 and 13, the corrugated tube 5, and the binding band 8 having the above-described structures, it is possible to improve water-blocking performance at the portion mounted with the grommet 40 to thereby prevent reduction in conductivity of the insulated wires 12 and 13.

The grommet 40 forming the grommet-equipped wire harness 100 is formed by the rear band mounting portion 415 on the outer peripheral face of the portion close to the rear end and overlapping the corrugated tube 5 fitted in the grommet 40, the rear end-side annular protruding portion 411 disposed close to the rear end, and the first fixed-side annular protruding portion 412 and the second fixed-side annular protruding portion 413 disposed at the predetermined interval on the inner peripheral face corresponding to the range of the rear band mounting portion 415. By providing the highly deformation absorbable portion 414 having higher deformation absorbing performance than the rear band mounting portion 415 is provided as a no-protrusion portion, where the protruding portion is not disposed, between the rear end-side annular protruding portion 411 and the first fixed-side annular protruding portion 412, it is possible to suppress deformation of the rear end of the grommet 40 caused by deformation of the rear band mounting portion 415 to thereby improve the water-blocking performance of the grommet 40.

This will be described in more detail. Because the highly deformation absorbable portion 414 having the higher deformation absorbing performance than the rear band mounting portion 415 is provided as the no-protrusion portion, where the protruding portion is not provided, between the rear end-side annular protruding portion 411 and the first fixed-side annular protruding portion 412, the highly deformation absorbable portion 414 absorbs an influence of the deformation of the rear band mounting portion 415 in a fastened state and therefore it is possible to suppress the deformation of the rear end of the grommet 40 caused by the deformation of the rear band mounting portion 415. As a result, the rear end-side annular protruding portion 411 disposed along the rear end opening edge of the grommet 40 with the rear band mounting portion 415 fastened by the binding band 8 can be fitted with the recess 5b of the corrugated tube 5 by use of the protruding and recessed shapes while in close contact with the recess 5b.

A grommet 40 having only one of annular protruding portions 410 may not be able to be stably fitted with a recess 5b of a corrugated tube 5. However, because the first fixed-side annular protruding portion 412 and the second fixed-side annular protruding portion 413 are disposed at the predetermined interval on the inner peripheral face corresponding to the range of the rear band mounting portion 415, a fastening load caused by fastening of the binding band 8 acts on the first fixed-side annular protruding portion 412 and the second fixed-side annular protruding portion 413 and it is possible to achieve the stable fitted state by use of the protruding and recessed shapes between the protrusions 5a and the recesses 5b of the corrugated tube 5 and the first fixed-side annular protruding portion 412 and the second fixed-side annular protruding portion 413.

Therefore, by forming the highly deformation absorbable portion 414 of the grommet 40 by use of a simple structure not provided with the annular protruding portion, it is possible to suppress entry of water into the grommet 40 across the rear end-side annular protruding portion 411 and to reliably prevent entry of the water into the grommet 40 across the first fixed-side annular protruding portion 412 and the second fixed-side annular protruding portion 413, which improves the water-blocking performance of the grommet 40.

The rear end of the grommet 40 may be radially expanded by use of a radially expanding jig in fitting the corrugated tube 5 into the grommet 40 in some cases. By providing the highly deformation absorbable portion 414 having the higher deformation absorbing performance than the rear band mounting portion 415 between the rear end-side annular protruding portion 411, and the first fixed-side annular protruding portion 412 and the second fixed-side annular protruding portion 413, it is possible to easily and radially expand the rear end of the grommet 40 to fit the corrugated tube 5.

Because the slits 412a for dividing the first fixed-side annular protruding portion 412 in the circumferential direction are provided to the first fixed-side annular protruding portion 412, deformation absorbing performance of the first fixed-side annular protruding portion 412 is improved, which reduces the influence of fastening deformation of the rear band mounting portion 415 by the binding band 8. Therefore, it is possible to suppress reduction in the water-blocking performance caused by the deformation of the rear end portion as a result of the fastening deformation of the rear band mounting portion 415.

The binding band 8 is formed by the band portion 8a and the lock portion 8b for locking the band portion 8a and the slits 412a are provided at the position of the first fixed-side annular protruding portion 412 corresponding to the lock portion 8b in the circumferential direction and the position facing the lock portion 8b. Therefore, it is possible to further improve the deformation absorbing performance of the first fixed-side annular protruding portion 412 for absorbing the deformation due to fastening of the rear band mounting portion 415.

This will be described in more detail. When the binding band 8 formed by the band portion 8a and the lock portion 8b for locking the band portion 8a is fastened, the binding band 8 is fastened into a substantially oval shape with the lock portion 8b and the portion facing the lock portion 8b positioned in a long axis direction. Therefore, by providing the slits 412a at the position of the first fixed-side annular protruding portion 412 corresponding to the lock portion 8b in the circumferential direction and the position facing the lock portion 8b, it is possible to further improve the deformation absorbing performance of the first fixed-side annular protruding portion 412.

Moreover, because the slits 412a are provided to the rear first fixed-side annular protruding portion 412 out of the annular protruding portions 410, as compared with a case in which the slits are provided to the forward second fixed-side annular protruding portion 413 out of the annular protruding portions 410, it is possible to improve the deformation absorbing performance of the rear first fixed-side annular protruding portion 412 to thereby suppress reduction in the water-blocking performance caused by the deformation of the rear end portion as a result of the fastening deformation of the rear band mounting portion 415.

Because the deformed recessed portion 46 in the recessed shape is provided in the outer peripheral face of the highly deformation absorbable portion 414, it is possible to improve the deformation absorbing performance of the highly deformation absorbable portion 414 to thereby suppress the reduction in the water-blocking performance caused by the deformation of the rear end portion as a result of the fastening deformation of the rear band mounting portion 415.

Moreover, by providing the rear end-side annular protruding portion 411 for suppressing entry of the water into the inside to the rear end, shape retaining performance of the rear end increases and the end portion may be deformed as a result of the fastening deformation of the rear band mounting portion 415, which may reduce the water-blocking performance. However, because the deformed recessed portion 46 is provided, it is possible to suppress the reduction in the water-blocking performance caused by the deformation of the rear end portion as a result of the fastening deformation of the rear band mounting portion 415 while suppressing entry of the water into the inside by use of the rear end-side annular protruding portion 411.

Moreover, because the deformed recessed portion 46 is in the tapered trapezoidal shape in the plan view having the groove width gradually reducing toward the rear end, the influence of the fastening deformation of the rear band mounting portion 415 gradually reduces from the rear band mounting portion 415 toward the rear end. By forming the deformed recessed portion 46 in the trapezoidal shape having the groove width gradually reducing toward the rear end, the deformation is not absorbed locally but absorbed by the entire highly deformation absorbable portion 414, which does not cause a local load.

The deformed recessed portion 46 has the groove deepest portion 46a at the position slightly displaced forward from the center in the front-rear direction X. The groove depth changes in the front-rear direction X so that the deformed recessed portion 46 becomes deep from the rear end of the deformed recessed portion 46 to the groove deepest portion 46a with the smooth inclination and becomes deep from the front of the deformed recessed portion 46 to the groove deepest portion 46a with the steep inclination. The groove deepest portion 46a is formed at the position corresponding to the position between the plurality of annular protruding portions 410 and more specifically, at such a position that at least a part of the groove deepest portion 46a overlaps the protrusion 5a of the fitted corrugated tube 5 when seen from radially outside. Therefore, it is possible to control the deformation absorbing performance of the highly deformation absorbable portion 414 obtained by the deformed recessed portion 46 to thereby achieve desired deformation.

This will be described in more detail. By changing the groove depth in the front-rear direction X to adjust the position of the groove deepest portion 46a in the front-rear direction X, it is possible to control the deformation absorbing performance of the highly deformation absorbable portion 414 obtained by the deformed recessed portion 46. Moreover, by forming the groove deepest portion 46a at the position corresponding to the protrusion 5a of the fitted corrugated tube 5 between the rear end-side annular protruding portion 411 and first fixed-side annular protruding portion 412, i.e., the position overlapping the protrusion 5a when seen from radially outside, it is possible to prevent unintended deformation such as curling of the highly deformation absorbable portion 414 as a result of provision of the deformed recessed portion 46.

As shown in FIG. 7C, because the deformed recessed portion 46 formed in the outer peripheral face and the slits 412a formed on sides of the first fixed-side annular protruding portion 412 are not aligned with each other in a sectional direction of the highly deformation absorbable portion 414, it is possible to spread, in the sectional direction, the influence of the deformation as a result of the fastening deformation of the rear band mounting portion 415 by the binding band 8 to prevent local deformation in the sectional direction.

By setting the length of the highly deformation absorbable portion 414 of the grommet 40 in the front-rear direction X to a length corresponding to the outer dimension W of the two protrusions 5a adjacent to each other in the front-rear direction X out of the plurality of protrusions 5a forming the corrugated tube 5, it is possible to further improve the water-blocking performance of the grommet.

This will be described in more detail. By setting the length of the highly deformation absorbable portion 414 in the front-rear direction X to the length corresponding to the outer dimension W of the two protrusions 5a adjacent to each other in the front-rear direction X, it is possible to obtain a wide interval between the rear end-side annular protruding portion 411 having the higher shape retaining performance than the highly deformation absorbable portion 414 and the first fixed-side annular protruding portion 412, which reliably increases the deformation absorbing performance of the highly deformation absorbable portion 414 between the rear end-side annular protruding portion 411 and the first fixed-side annular protruding portion 412 and it is possible to reliably fit the rear end-side annular protruding portion 411 and the recess 5b of the corrugated tube 5 with each other by use of the protruding and recessed shapes.

On the other hand, by setting the length of the highly deformation absorbable portion 414 in the front-rear direction X to the length corresponding to the outer dimension W of the two protrusions 5a adjacent to each other in the front-rear direction X, it is possible to suppress excessive increase in the deformation absorbing performance of the highly deformation absorbable portion 414 between the rear end-side annular protruding portion 411 and the first fixed-side annular protruding portion 412. In other words, it is possible to maintain a certain level of shape retaining performance to accurately fit the protrusions 5a and the recesses 5b of the corrugated tube 5 and the rear end-side annular protruding portion 411 and the first fixed-side annular protruding portion 412 with each other by the protruding and recessed shapes.

In this way, it is possible to further improve the water-blocking performance of the grommet 40.

By forming the rear band mounting portion 415 of the grommet 40 in the groove shape recessed from the outer peripheral face, the binding band 8 can be disposed in such a manner as to be fitted in the rear band mounting portion 415 to correspond to the first fixed-side annular protruding portion 412 and the second fixed-side annular protruding portion 413. Therefore, it is possible to reliably cause the fastening load generated by fastening of the binding band 8 to act on the first fixed-side annular protruding portion 412 and the second fixed-side annular protruding portion 413.

In this way, it is possible to reliably maintain the fitted state by use of the protruding and recessed shapes between the protrusions 5a and the recesses 5b of the corrugated tube 5 and the first fixed-side annular protruding portion 412 and the second fixed-side annular protruding portion 413 to thereby secure the water-blocking performance of the grommet 40.

By forming the rear band mounting portion 415 of the grommet 40 with the mounting portion groove width W3 smaller than twice the band width W1 and by forming the first fixed-side annular protruding portion 412 and the second fixed-side annular protruding portion 413 on the inner peripheral face corresponding to the range of the rear band mounting portion 415 which is the clearance length away in the front-rear direction X from each of the one wall portion and the other wall portion, it is possible to reliably cause the fastening load generated by fastening of the binding band 8 to act on the plurality of first fixed-side annular protruding portion 412 and second fixed-side annular protruding portion 413, even if the binding band 8 is displaced to one side in the rear band mounting portion 415.

This will be described in more detail. It is possible to position the first fixed-side annular protruding portion 412 and the second fixed-side annular protruding portion 413 in the range corresponding to the binding band 8 displaced in the front-rear direction X as in the state in which the binding band 8 is in contact with the one wall portion of the rear band mounting portion 415, in contact with the other wall portion, or oblique with respect to the width direction of the rear band mounting portion 415.

In this way, even if the binding band 8 is displaced in the front-rear direction X in the rear band mounting portion 415, it is possible to reliably cause the fastening load to act on the plurality of first fixed-side annular protruding portion 412 and second fixed-side annular protruding portion 413 to thereby improve the water-blocking performance of the grommet 40.

By providing the first fixed-side annular protruding portion 412 and the second fixed-side annular protruding portion 413 to the grommet 40, it is possible to spread the fastening load generated by the fastening of the binding band 8 only between the first fixed-side annular protruding portion 412 and the second fixed-side annular protruding portion 413. Therefore, it is possible to prevent reduction in the fastening load acting on each of the first fixed-side annular protruding portion 412 and the second fixed-side annular protruding portion 413 to thereby cause the desired fastening load to act on each of the first fixed-side annular protruding portion 412 and the second fixed-side annular protruding portion 413.

This will be described in more detail. If protruding portions other than the first fixed-side annular protruding portion 412 and the second fixed-side annular protruding portion 413 are disposed in the range corresponding to the rear band mounting portion 415, the fastening load is spread among the plurality of protruding portions including the first fixed-side annular protruding portion 412 and the second fixed-side annular protruding portion 413 and the fastening load acting on one protruding portion reduces. However, by restricting the protruding portions disposed in the range corresponding to the rear band mounting portion 415 to the first fixed-side annular protruding portion 412 and the second fixed-side annular protruding portion 413, it is possible to prevent reduction in the fastening load acting on one protruding portion.

In this way, the first fixed-side annular protruding portion 412 and the second fixed-side annular protruding portion 413 can be stably fitted with the protrusions 5*a* and the recesses 5*b* of the corrugated tube 5 by use of the protruding and recessed shapes under the predetermined fastening loads, which more reliably improves the water-blocking performance of the grommet 40.

By forming the inside diameter of the grommet 40 smaller than the outside diameter of the corrugated tube 5, the corrugated tube 5 expands the grommet 40 or the grommet 40 compresses the corrugated tube 5. In other words, the inner peripheral face of the grommet 40 and the outer peripheral face of the corrugated tube 5 come in close contact with each other while pushing each other radially inward and outward, which improves sealing performance of the grommet 40 to further improve the water-blocking performance of the grommet 40.

Moreover, by disposing the rear end-side annular protruding portion 411 of the grommet 40 along the rear end, it is possible to prevent entry of the water into the inside from the rear end of the grommet 40, even when high-pressure washing of an area around the grommet 40 is carried out.

This will be described in more detail. For example, in carrying out the high-pressure washing for washing the area around the grommet 40 by use of water jetted at high pressure, if the rear end-side annular protruding portion 411 is disposed on the inner side of the rear end of the grommet 40, the water jetted at the high-pressure easily passes through between the corrugated tube 5 and the grommet 40 and reaches the rear end-side annular protruding portion 411 to curl up the rear end of the grommet 40 with water pressure acting on the inner side. However, by disposing the rear end-side annular protruding portion 411 along the rear end of the grommet 40, it is possible to prevent the water from entering the grommet 40 to curl up the rear end.

By providing the inclined portion 41*a* which gradually becomes thinner toward the rear end to the outer peripheral face near the rear end of the grommet 40, it is possible to further improve the deformation absorbing performance of the rear end of the grommet 40 and therefore it is possible to suppress the deformation of the rear end of the grommet 40 as a result of the deformation of the rear band mounting portion 415 to reliably fit the recess 5*b* of the corrugated tube 5 and the rear end-side annular protruding portion 411 with each other by use of the recessed and protruding shapes through cooperation between the rear end of the grommet 40 and the highly deformation absorbable portion 414.

Furthermore, even if the high-pressure washing of the grommet 40 is carried out, the provision of the inclined portion 41*a* reduces an area of the rear end of the grommet 40 to thereby reduce water pressure of the jetted water received by a rear end face and allow the water jetted at the rear end of the grommet 40 to flow along an outer peripheral face of the inclined portion 41*a*. As a result, it is possible to more reliably prevent curling up of the rear end of the grommet 40.

Although the front band mounting portion 442 having the front wall portion 442*a* and the rear wall portion 442*b* with the smaller heights than the wall thickness of the band portion 6*a* of the binding band 6 are described above, the present invention is not restricted to them. A front band mounting portion 442 having a front wall portion 442*a* and a rear wall portion 442*b* with greater heights than a wall thickness of a band portion 6*a* of a binding band 6 may be employed.

The present invention is not restricted to the interval between the rear end-side annular protruding portion 411 and the first fixed-side annular protruding portion 412 which is formed so that the two adjacent protrusions 5*a* of the corrugated tube 5 can be disposed in the interval when the corrugated tube 5 is fitted in the grommet 40. An interval may be formed so that three adjacent protrusions 5*a* can be disposed in the interval.

Although the corrugated tube 5 is formed in the accordion shape having the recessed and protruding section, a corrugated tube 5 may be an armoring member having an outside shape with a recessed and protruding section and a flat inside shape, for example. Furthermore, the sectional shapes of the protrusions 5*a* and the recesses 5*b* are not restricted to the trapezoidal shapes but may be substantially arc shapes.

Moreover, material of the binding band 8 is not restricted to synthetic resin but may be metal.

In addition, the rear band mounting portion 415 does not necessarily have to be formed in the recessed shape along the circumferential direction. The rear band mounting portion 415 may be a protruding rear band mounting portion formed by protruding an outer peripheral face of a grommet 40 outward on opposite sides of a binding band 8 in a front-rear direction X or a flat rear band mounting portion.

Structures in the present invention correspond to those in the above-described embodiment as follows.

An armoring member in the present invention corresponds to the corrugated tube 5 in the embodiment. Similarly, a protrusion corresponds to the protrusion 5a, a fastening member corresponds to the binding band 8, a thin-walled end portion corresponds to the inclined portion 41a, a protruding portion and an end portion-side protruding portion correspond to the rear end-side annular protruding portion 411, a protruding portion and a fixed-side protruding portion correspond to the first fixed-side annular protruding portions 412 and 413, a no-protrusion portion corresponds to the highly deformation absorbable portion 414, a circumferential dividing portion corresponds to the slit 412a, a fastening fixing portion and a fastening groove portion correspond to the rear band mounting portion 415, an axial direction corresponds to the front-rear direction X, a band portion corresponds to the band portion 8a, a fastening width corresponds to the band width W1, and a recessed groove width corresponds to the mounting portion groove width W3. However, the present invention is not restricted to the structures in the above-described embodiment and many embodiments are available.

Although the slits 412a are formed by the cuts dividing the first fixed-side annular protruding portion 412 in the circumferential direction in the above description, the slits 412a may be formed by grooves or recessed portions. Depths of the slits 412a may be about half a protruding amount of the first fixed-side annular protruding portion 412.

Although the slits 412a are provided at the two positions, i.e., the position corresponding to the lock disposing portion 415a and the position facing the lock disposing portion 415a as shown in FIG. 7B, (a) slit(s) may be provided at a position or up to about four positions in a circumferential direction of a first fixed-side annular protruding portion 412. If the plurality of slits 412a are provided in this manner, the slits 412a may be disposed uniformly in the circumferential direction of the first fixed-side annular protruding portion 412 or the plurality of slits 412a may be provided in a predetermined range of the circumferential direction.

Although the slits 412a are provided to the first fixed-side annular protruding portion 412 out of the fixed-side annular protruding portions 412 and 413, slits may be provided to the second fixed-side annular protruding portion 413 as well or may be provided to only the second fixed-side annular protruding portion 413.

Although the deformed recessed portion 46 is formed in the substantially trapezoidal shape in the plan view having the groove width gradually reducing toward the rear end in the front-rear direction X as shown in FIG. 12A the deformed recessed portion 46 may be in a substantially drop shape in a plan view having an arc-shaped rear end as shown in FIG. 12B or may be in a recessed portion which is longer in a circumferential direction than in a front-rear direction X as shown in FIG. 12C Although the deformed recessed portion 46 having the groove depth changing in the front-rear direction X is formed to have the groove deepest portion 46a at the position slightly displaced forward from the center in the front-rear direction X, to become deep from the rear end of the deformed recessed portion 46 to the groove deepest portion 46a with the smooth inclination, and to become deep from the front of the deformed recessed portion 46 to the groove deepest portion 46a with the steep inclination as shown in FIG. 12D a deformed recessed portion 46 may be formed to have a groove deepest portion 46a near a center of the deformed recessed portion 46 in a front-rear direction X and to become deep from front and rear opposite sides of the deformed recessed portion 46 to the groove deepest portion 46a with smooth inclinations as shown in FIG. 12E or a deformed recessed portion 46 may be formed to have a groove deepest portion 46a at a position slightly displaced rearward from a center of the deformed recessed portion 46 in a front-rear direction X, to become deep from a front of the deformed recessed portion 46 to the groove deepest portion 46a with a smooth inclination, and to become deep from a rear end of the deformed recessed portion 46 to the groove deepest portion 46a with a steep inclination as shown in FIG. 12F In this way, by changing the groove depth in the front-rear direction X and adjusting the position of the groove deepest portion 46a in the front-rear direction X, it is possible to control the deformation absorbing performance of the highly deformation absorbable portion 414 obtained by the deformed recessed portion 46. By forming the groove deepest portion 46a at the position corresponding to the position between the plurality of protruding portions, it is possible to prevent the unintended deformation such as the curling of the highly deformation absorbable portion 414 as a result of provision of the deformed recessed portion 46.

Moreover, a deformed recessed portion 46 may be formed in an outer peripheral face of a branch portion 42 or slits 412a may be provided to a first fixed-side annular protruding portion 412 at a branch portion 42. In this way, it is possible to obtain similar effects to those of the deformed recessed portion 46 and the slits 412a at the highly deformation absorbable portion 414 provided to the rear end of the wire surrounding portion 41.

DESCRIPTION OF REFERENCE SIGNS

5: Corrugated tube
5a: Protrusion
8: Binding band
8a: Band portion
8b: Lock portion
12: Insulated wire
13: Insulated wire
40: Grommet
41a: Inclined portion
46: Deformed recessed portion
46a: Groove deepest portion
100: Grommet-equipped wire harness
410: Annular protruding portion
411: Rear end-side annular protruding portion
412: First fixed-side annular protruding portion
412a: Slit
413: Second fixed-side annular protruding portion
414: Highly deformation absorbable portion
415: Rear band mounting portion
X: Front-rear direction
W: Outer dimension
W1: Band width
W3: Mounting portion groove width

The invention claimed is:

1. A grommet which is in a substantially cylindrical shape and has elasticity and in which an accordion armoring member that surrounds an insulated wire is fitted from an end portion, the grommet comprising:

a fastening fixing portion which fastens and fixes a portion displaced from the end portion and overlapping the armoring member fitted in the grommet by using a band-shaped fastening member; and a plurality of protruding portions protruding from an inner peripheral face and extending in a circumferential direction and disposed along an axial direction so as to be fitted with the armoring member by use of protruding and recessed shapes, wherein the protruding portions are formed by an end portion-side protruding portion disposed adjacent to the end portion and a plurality of fixed-side protruding portions disposed at a predetermined interval on the inner peripheral face of the fastening fixing portion, wherein a no-protrusion portion where the protruding portion is not disposed is provided between the end portion-side protruding portion and the fixed-side protruding portions, and wherein a circumferential dividing portion which divides the fixed-side protruding portion in the circumferential direction is provided to the fixed-side protruding portion.

2. The grommet according to claim 1, wherein the fastening member is formed by a band portion and a lock portion which locks the band portion, and the circumferential dividing portion is provided at a position of the fixed-side protruding portion corresponding to the lock portion in the circumferential direction and/or an opposed position.

3. The grommet according claim 1, wherein the circumferential dividing portion is provided to the fixed-side protruding portion adjacent to the end portion out of the plurality of fixed-side protruding portions.

4. The grommet according to claim 1, wherein the plurality of fixed-side protruding portions are formed by the two fixed-side protruding portions.

5. The grommet according to claim 1, wherein the end portion-side protruding portion is disposed along the end portion.

6. The grommet according to claim 1, wherein a thin-walled end portion gradually becoming thinner toward the end portion is provided to the outer peripheral face adjacent the end portion.

7. The grommet according to claim 1, wherein a length of the no-protrusion portion in the axial direction is set to a length greater than or equal to an outer dimension of the two protrusions adjacent to each other in the axial direction out of the plurality of protrusions forming an accordion shape of the armoring member and smaller than or equal to an outer dimension of the three protrusions.

8. A grommet-equipped wire harness comprising:

the grommet according to claim 1;

the insulated wire which is inserted through the grommet;

the armoring member which surrounds the insulated wire to protect the wire and which is fitted in the grommet from the end portion; and the fastening member which fastens the fastening fixing portion provided to the grommet.

9. A grommet which is in a substantially cylindrical shape and has elasticity and in which an accordion armoring member that surrounds an insulated wire is fitted from an end portion, the grommet comprising:

a fastening fixing portion which fastens and fixes a portion displaced from the end portion and overlapping the armoring member fitted in the grommet by using a band-shaped fastening member; and a plurality of protruding portions protruding from an inner peripheral face and extending in a circumferential direction and disposed along an axial direction so as to be fitted with the armoring member by use of protruding and recessed shapes, wherein the protruding portions are formed by an end portion-side protruding portion disposed adjacent to the end portion and a plurality of fixed-side protruding portions disposed at a predetermined interval on the inner peripheral face of the fastening fixing portion, wherein a no-protrusion portion where the protruding portion is not disposed is provided between the end portion-side protruding portion and the fixed-side protruding portions, and wherein a deformed recessed portion in a recessed shape is foitned in an outer peripheral face of an area on a side of the fastening fixing portion adjacent to the end portion.

10. The grommet according to claim 9, wherein a circumferential dividing portion which divides the fixed-side protruding portion in the circumferential direction is provided to the fixed-side protruding portion.

11. The grommet according to claim 10, wherein the fastening member is formed by a band portion and a lock portion which locks the band portion, and the circumferential dividing portion is provided at a position of the fixed-side protruding portion corresponding to the lock portion in the circumferential direction and/or an opposed position.

12. The grommet according to claim 10, wherein the circumferential dividing portion is provided to the fixed-side protruding portion adjacent to the end portion out of the plurality of fixed-side protruding portions.

13. The grommet according to claim 9, wherein the deformed recessed portion is formed in a tapered shape having a groove width gradually reducing toward the end portion.

14. The grommet according to claim 9, wherein the deformed recessed portion has a groove depth changing in the axial direction and a groove deepest portion is formed at a position corresponding to a protrusion of the armoring member.

15. The grommet according to claim 9, wherein the plurality of fixed-side protruding portions are formed by the two fixed-side protruding portions.

16. The grommet according to claim 9, wherein the end portion-side protruding portion is disposed along the end portion.

17. The grommet according to claim 9, wherein a thin-walled end portion gradually becoming thinner toward the end portion is provided to the outer peripheral face adjacent the end portion.

18. The grommet according to claim 9, wherein a length of the no-protrusion portion in the axial direction is set to a length greater than or equal to an outer dimension of the two protrusions adjacent to each other in the axial direction out of the plurality of protrusions forming an accordion shape of the armoring member and smaller than or equal to an outer dimension of the three protrusions.

19. A grommet-equipped wire harness comprising:
the grommet according to claim 9;
the insulated wire which is inserted through the grommet;
the armoring member which surrounds the insulated wire to protect the wire and which is fitted in the grommet from the end portion; and
the fastening member which fastens the fastening fixing portion provided to the grommet.

* * * * *